United States Patent
Kluss et al.

(10) Patent No.: US 11,802,643 B2
(45) Date of Patent: Oct. 31, 2023

(54) FLUID CONNECTOR

(71) Applicant: Reliance Worldwide Corporation, Atlanta, GA (US)

(72) Inventors: William Vernon Kluss, Woombye (AU); Sai Kishore Ravisankar, Atlanta, GA (US); James Fade, West Drayton (GB); Joshua Smith, West Drayton (GB); Glen Ansell, West Drayton (GB)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 366 days.

(21) Appl. No.: 17/049,635

(22) PCT Filed: Apr. 23, 2019

(86) PCT No.: PCT/US2019/028772
§ 371 (c)(1),
(2) Date: Oct. 22, 2020

(87) PCT Pub. No.: WO2019/209860
PCT Pub. Date: Oct. 31, 2019

(65) Prior Publication Data
US 2021/0071793 A1    Mar. 11, 2021

Related U.S. Application Data

(60) Provisional application No. 62/682,098, filed on Jun. 7, 2018, provisional application No. 62/662,147, filed on Apr. 24, 2018.

(51) Int. Cl.
*F16L 37/091* (2006.01)
*F16L 41/02* (2006.01)
*F16L 43/00* (2006.01)

(52) U.S. Cl.
CPC .......... *F16L 37/091* (2013.01); *F16L 41/021* (2013.01); *F16L 43/008* (2013.01)

(58) Field of Classification Search
CPC ... F16L 37/091; F16L 37/092; F16L 37/0925; F16L 37/0926; F16L 37/12;
(Continued)

(56) References Cited

U.S. PATENT DOCUMENTS

| 788,600 A | 5/1905 | Rogers |
|---|---|---|
| D194,015 S | 11/1962 | Stringham |

(Continued)

FOREIGN PATENT DOCUMENTS

| CN | 202812590 U | 3/2013 |
|---|---|---|
| CN | 102788212 B | 11/2014 |

(Continued)

OTHER PUBLICATIONS

International Preliminary Report on Patentability on PCT Appl. Ser. No. PCT/US2019/028772 dated Nov. 5, 2020 (8 pages).
(Continued)

*Primary Examiner* — Aaron M Dunwoody
(74) *Attorney, Agent, or Firm* — Barnes & Thornburg LLP

(57) ABSTRACT

A connector for a fluid line includes a sleeve having a hollow portion at least partway therethrough. The sleeve includes an engaging portion. A collet having an engaging part is secured to the engaging portion. A grab part has one or more teeth configured to retain the fluid line, and the teeth are located in the hollow portion. A locking part is provided having a locking portion, and the locking part is configured to move from a first position to a second position where the locking portion locks with a locking piece to assist with forming a fluid seal with the fluid line.

30 Claims, 14 Drawing Sheets

(58) Field of Classification Search
CPC ..... F16L 37/123; F16L 37/133; F16L 37/138; F16L 2201/10
See application file for complete search history.

(56) References Cited

U.S. PATENT DOCUMENTS

| | | | |
|---|---|---|---|
| 3,819,207 A | | 6/1974 | Leopold, Jr. |
| 4,248,460 A | | 2/1981 | Murray et al. |
| 4,265,470 A | | 5/1981 | Danner |
| 4,406,485 A | | 9/1983 | Giebeler |
| 4,407,526 A | * | 10/1983 | Cicenas ............... F16L 37/0926 285/27 |
| 4,431,216 A | * | 2/1984 | Legris ................. F16L 37/0925 285/104 |
| 4,642,155 A | | 2/1987 | Ramsey |
| 4,993,755 A | | 2/1991 | Johnston |
| 5,299,838 A | * | 4/1994 | Yang ....................... F16L 19/08 285/104 |
| 5,413,386 A | | 5/1995 | Dal Palú |
| 5,584,513 A | | 12/1996 | Sweeny et al. |
| 5,692,784 A | | 12/1997 | Hama et al. |
| 5,921,588 A | * | 7/1999 | Vogel .................... F16L 19/075 285/23 |
| 6,027,143 A | * | 2/2000 | Berg .................. F16L 37/0885 285/305 |
| 6,027,144 A | * | 2/2000 | Hagen .................. F16L 37/088 285/918 |
| 6,095,570 A | * | 8/2000 | Hagen .................. F16L 37/084 285/321 |
| 6,258,197 B1 | | 7/2001 | Helander |
| D449,515 S | | 10/2001 | Sato |
| 6,334,634 B1 | | 1/2002 | Osterkil |
| D461,545 S | | 8/2002 | Nishio |
| 6,443,500 B1 | * | 9/2002 | Inoue ..................... F16L 47/12 285/23 |
| D482,761 S | | 11/2003 | Gotoh et al. |
| 6,913,292 B2 | | 7/2005 | Synder, Sr. et al. |
| 6,964,436 B2 | | 11/2005 | Le Quere |
| 7,025,842 B2 | | 4/2006 | Monsheimer et al. |
| D529,998 S | | 10/2006 | Mutou |
| 7,270,349 B2 | | 9/2007 | Bamberger et al. |
| 7,293,804 B2 | | 11/2007 | Li et al. |
| 7,384,074 B2 | | 6/2008 | He |
| 7,475,913 B2 | | 1/2009 | Muto |
| 7,621,569 B2 | | 11/2009 | Anthoine |
| D615,165 S | | 5/2010 | McAlpine et al. |
| 7,850,208 B2 | | 12/2010 | Greenberger |
| 7,862,089 B2 | | 1/2011 | Crompton |
| 7,867,420 B2 | | 1/2011 | Wolter |
| 8,025,318 B1 | | 1/2011 | Morroney et al. |
| D638,919 S | | 5/2011 | Grether |
| 8,205,915 B1 | | 6/2012 | Crompton et al. |
| 8,210,576 B2 | | 7/2012 | Crompton |
| 8,398,122 B2 | | 3/2013 | Crompton et al. |
| 8,480,134 B2 | | 7/2013 | Crompton et al. |
| 8,746,752 B2 | | 6/2014 | Hayashi et al. |
| D710,485 S | | 8/2014 | Nudo |
| D710,977 S | | 8/2014 | Chen |
| D713,943 S | | 9/2014 | Luke |
| 8,844,981 B1 | | 9/2014 | Crompton et al. |
| 8,857,861 B2 | | 10/2014 | German et al. |
| D722,362 S | | 2/2015 | Kluss et al. |
| D722,363 S | | 2/2015 | Kluss et al. |
| 9,052,023 B2 | | 6/2015 | Janousek |
| 9,068,680 B1 | | 6/2015 | Crompton et al. |
| 9,217,529 B2 | | 12/2015 | Crompton et al. |
| D746,951 S | | 1/2016 | Gledhill et al. |
| D746,952 S | | 1/2016 | Gledhill et al. |
| D746,953 S | | 1/2016 | Gledhill et al. |
| D746,954 S | | 1/2016 | Gledhill et al. |
| D746,958 S | | 1/2016 | Gledhill et al. |
| 9,228,681 B2 | | 1/2016 | Kluss |
| D751,673 S | | 3/2016 | Gledhill et al. |
| D751,674 S | | 3/2016 | Gledhill et al. |
| D751,675 S | | 3/2016 | Gledhill et al. |
| D754,303 S | | 4/2016 | Smith |
| 9,322,496 B1 | | 4/2016 | Crompton et al. |
| D756,494 S | | 5/2016 | Gledhill et al. |
| 9,447,906 B2 | | 9/2016 | Bobo et al. |
| 9,541,228 B2 | | 1/2017 | Bobo et al. |
| 9,574,691 B1 | | 2/2017 | Crompton et al. |
| 9,671,049 B1 | | 6/2017 | Crompton et al. |
| 9,772,058 B2 | * | 9/2017 | Le Quere ............. F16L 37/091 |
| 9,777,875 B2 | | 10/2017 | Bobo et al. |
| 9,816,655 B2 | | 11/2017 | Crompton et al. |
| 9,822,912 B2 | | 11/2017 | Crompton et al. |
| 9,879,810 B2 | | 1/2018 | Crompton et al. |
| 9,903,518 B2 | | 2/2018 | Clason et al. |
| 9,920,866 B2 | | 3/2018 | Crompton et al. |
| 9,958,100 B2 | | 5/2018 | Williams et al. |
| 10,006,575 B2 | | 6/2018 | Bobo et al. |
| D823,442 S | | 7/2018 | Sugatani et al. |
| 10,016,856 B2 | | 7/2018 | Neal et al. |
| 10,072,783 B2 | | 9/2018 | Gledhill et al. |
| D830,522 S | | 10/2018 | Di Liberto |
| 10,094,500 B2 | | 10/2018 | Crompton et al. |
| 10,114,326 B2 | | 10/2018 | Yamashita |
| D833,581 S | | 11/2018 | Atwell et al. |
| 10,180,202 B2 | | 1/2019 | Crompton et al. |
| 10,458,582 B2 | | 10/2019 | Williams et al. |
| 10,480,699 B2 | | 11/2019 | Meister et al. |
| 10,550,966 B2 | | 2/2020 | Blomberg |
| 10,578,235 B2 | | 3/2020 | Graham et al. |
| 10,584,820 B2 | | 3/2020 | Williams et al. |
| 10,619,780 B2 | | 4/2020 | Clason et al. |
| 10,704,722 B2 | | 7/2020 | Williams et al. |
| D902,360 S | | 11/2020 | Kluss et al. |
| 10,850,451 B2 | | 12/2020 | Lennon et al. |
| D908,846 S | | 1/2021 | Kluss et al. |
| D908,847 S | | 1/2021 | Kluss et al. |
| D908,848 S | | 1/2021 | Kluss et al. |
| 10,962,153 B2 | | 3/2021 | Kluss et al. |
| 10,969,047 B1 | | 4/2021 | Crompton et al. |
| D919,775 S | | 5/2021 | Kluss et al. |
| 11,002,395 B2 | | 5/2021 | Williams et al. |
| 11,105,452 B1 | | 8/2021 | Dias et al. |
| D943,407 S | | 2/2022 | Buckley et al. |
| D984,597 S | | 4/2023 | Wang |
| 2002/0125721 A1 | * | 9/2002 | Imaeda ............... F16L 37/0985 285/305 |
| 2002/0163191 A1 | | 11/2002 | Muenster et al. |
| 2003/0001385 A1 | | 1/2003 | Favre et al. |
| 2004/0245766 A1 | | 12/2004 | Vallee |
| 2004/0262920 A1 | * | 12/2004 | Le Quere ............. F16L 37/0925 285/319 |
| 2005/0285394 A1 | | 12/2005 | Muto |
| 2006/0108705 A1 | | 5/2006 | Rowley |
| 2007/0001454 A1 | | 1/2007 | Saving et al. |
| 2008/0136166 A1 | | 6/2008 | Guest |
| 2008/0314205 A1 | | 12/2008 | Feliciano |
| 2009/0026758 A1 | | 1/2009 | Sanzone |
| 2010/0025986 A1 | | 2/2010 | Seton-Anderson |
| 2011/0025054 A1 | | 2/2011 | Kluss |
| 2011/0042943 A1 | * | 2/2011 | Gershkovich .......... G16H 40/63 285/308 |
| 2011/0285126 A1 | | 11/2011 | Jahan |
| 2012/0096700 A1 | | 4/2012 | Patterson et al. |
| 2013/0119659 A1 | | 5/2013 | Williams et al. |
| 2013/0181446 A1 | * | 7/2013 | Le Clinche ............. F16L 43/00 285/345 |
| 2013/0257036 A1 | * | 10/2013 | Guest .................. F16L 37/0925 285/332 |
| 2014/0152002 A1 | | 6/2014 | Crompton et al. |
| 2015/0159792 A1 | | 6/2015 | Bobo et al. |
| 2015/0240980 A1 | | 8/2015 | Bobo et al. |
| 2016/0040812 A1 | | 2/2016 | Lai |
| 2016/0327196 A1 | * | 11/2016 | Gledhill ................ F16L 37/091 |
| 2017/0082229 A1 | | 3/2017 | Meissner |
| 2018/0001571 A1 | | 1/2018 | Lennon et al. |
| 2020/0276771 A1 | | 9/2020 | Shi et al. |
| 2020/0378536 A1 | | 12/2020 | Osteen et al. |
| 2021/0071793 A1 | | 3/2021 | Kluss et al. |

(56) References Cited

U.S. PATENT DOCUMENTS

| 2021/0172553 | A1 | 6/2021 | Kluss et al. |
| 2021/0285584 | A1 | 9/2021 | Ravisankar et al. |
| 2021/0324986 | A1 | 10/2021 | Simon |

FOREIGN PATENT DOCUMENTS

| CN | 206723646 | U | 12/2017 |
| CN | 207333974 | U | 5/2018 |
| CN | 208169780 | U | 11/2018 |
| CN | 208487316 | U | 2/2019 |
| CN | 208651875 | U | 3/2019 |
| CN | 208997526 | U | 6/2019 |
| CN | 209960045 | U | 1/2020 |
| CN | 210510666 | U | 5/2020 |
| CN | 112384726 | A | 2/2021 |
| CN | 212455889 | U | 2/2021 |
| DE | 10114326 | A1 | 10/2002 |
| DE | 202008006949 | U1 | 9/2008 |
| GB | 1555640 | A | 11/1979 |
| GB | 2143918 | A | 2/1985 |
| JP | 2003314763 | A | 11/2003 |
| JP | 2004324858 | A | 11/2004 |
| JP | 20080286258 | A | 11/2008 |
| JP | 2010043729 | A | 2/2010 |
| JP | 2012077803 | A | 4/2012 |
| JP | 2012180940 | A | 9/2012 |
| JP | 2012219894 | A | 11/2012 |
| JP | 2016075308 | A | 5/2016 |
| MY | 143104 | A | 3/2011 |
| WO | 2020036637 | A1 | 2/2020 |
| WO | 2021101383 | A2 | 5/2021 |

OTHER PUBLICATIONS

US Notice of Allowance on U.S. Appl. No. 29/689,799 dated Jan. 22, 2021 (7 pages).
Final Office Action on U.S. Appl. No. 29/689,799 dated Oct. 8, 2020.
Foreign Action other than Search Report on CN Appl. Ser. No. 2019305973504 dated May 8, 2020 (1 Page) (No English Translation).
International Search Report and Written Opinion issued in Appl. Ser. No. PCT/US2019/025851 dated Jun. 25, 2019 (12 pages).
International Search Report and Written Opinion issued in Appl. Ser. No. PCT/US2019/028772 dated Jul. 25, 2019 (9 pages).
Non-Final Office Action on U.S. Appl. No. 29/689,799 dated Jun. 23, 2020 (10 pages).
US Notice of Allowance on U.S. Appl. No. 29/689,798 dated Sep. 11, 2020 (5 pages).
US Notice of Allowance on U.S. Appl. No. 29/689,798 dated Sep. 23, 2020 (5 pages).
US Office Action on U.S. Appl. No. 29/689,798 dated Jun. 24, 2020 (7 pages).
Extended European Search Report for EP Application No. 19792913.6 dated Dec. 13, 2021 (10 pages).
EP Supplementary European Search Report; European Patent Application No. 19792913.6; dated Dec. 13, 2021.
Design U.S. Appl. No. 29/677,195; dated Jan. 17, 2019; Reliance Worldwide Corporation.
US Ex Parte Quayle Office Action; U.S. Appl. No. 29/686,256; dated Jun. 24, 2020.
US Final Office Action; U.S. Appl. No. 17/050,714; dated Mar. 31, 2023.
US Non-Final Office Action; U.S. Appl. No. 29/821,932; dated Jun. 2, 2023.
US Non-Final Office Action; U.S. Appl. No. 29/832,045; dated May 24, 2023.
US Non-Final Office Action; U.S. Appl. No. 29/834,892; dated May 24, 2023.
US Notice of Allowance; U.S. Appl. No. 29/686,256; dated Sep. 11, 2020.
US Notice of Allowance (Corrected); U.S. Appl. No. 29/686,256; dated Sep. 23, 2020.
U.S. Appl. No. 62/662,147; dated Apr. 24, 2018; Reliance Worldwide Corporation.
U.S. Appl. No. 62/682,098; dated Jun. 7, 2018; Reliance Worldwide Corporation.
U.S. Appl. No. 62/718,562; dated Aug. 14, 2018; Reliance Worldwide Corporation.
WO International Patent Application No. PCT/CN2021/082998; dated Mar. 25, 2021; Reliance Worldwide Corporation.
WO International Patent Application No. PCT/US2019/025851; dated Apr. 4, 2019; Reliance Worldwide Corporation.
WO International Patent Application No. PCT/US2019/028772; dated Apr. 23, 2019; Reliance Worldwide Corporation.
WO International Search Report and Written Opinion; International Patent Application No. PCT/US2022/076157; dated Jan. 4, 2023.
WO International Preliminary Report on Patentability; International Patent Application No. PCT/US2019/025851; dated Feb. 16, 2021.
EP Supplementary European Search Report; European Patent Application No. 19850630.5; dated May 10, 2022.

* cited by examiner

FLUID CONNECTOR

CROSS-REFERENCE TO RELATED APPLICATIONS

The present application is a national stage of International Patent Application No. PCT/US2019/028772, filed Apr. 23, 2019, which claims the benefit of priority to U.S. Provisional Patent Application No. 62/662,147 filed Apr. 24, 2018 and U.S. Provisional Patent Application No. 62/682,098 filed Jun. 7, 2018, the disclosures of which are herein incorporated by reference in their entireties.

STATEMENT RE: FEDERALLY SPONSORED RESEARCH/DEVELOPMENT

Not Applicable

BACKGROUND

A variety of connectors exist by which plumbers may connect the ends of fluid-carrying tubes, such as the flexible or rigid tubes between water pipes and faucets, or between water pipes and appliances such as refrigerators. These connectors are referred to as in-line connectors, slide connectors, tube couplings, and other names. These connectors are also used to connect tubes to fluid joints, such as elbows, T-sections, blind ends, etc.

As illustrated by U.S. Published Application number 2008/0314205 and U.S. Pat. No. 8,322,755, these fluid connectors typically have an O-ring seal on each of the joined tubes to prevent fluid leakage along each of the two tubes, and the connectors also have a separate locking mechanism to secure the connector to one tube and may have an interlocking mechanism to connect two tubes and prevent separation of the tubes joined by the connectors. The locking mechanisms must be strong enough to prevent the water pressure from pushing the tubes off the connector. The locking mechanism are typically permanent and resist removal unless part of the connecting mechanism is broken, as achieved for example, by flaring the tube ends or deforming grab rings.

However, as appreciated by the inventors of the present disclosure, the existing connections need improvement. For example, improvement is needed because such connections may require the plumber to manually arrange various parts in sequence, such as locking rings, washers and threaded fasteners and one or more of the parts are inevitably dropped at the most inconvenient time, or a part is in the wrong orientation. Thus, for example, if a plumber forgets to put a coupler and washer onto a tube before flaring the end of the tube, the flared end must be recut and began anew. There is thus a need for a tubular line connector with simplified parts and connectability.

As further appreciated, existing connections may require modification of the fluid lines to make the connectors work, as when the tube ends are flared before being joined by a connector, and that modification is required after the connector parts are slipped over the unflared tube end. There is thus a need for a tubular line connector which avoids the need to modify the tube ends and which also avoids arranging parts on the tubes in the correct order and orientation before the connection is made.

Additionally, existing connections may require using special tools and special tubing to form fluid connections. An example of this is when the end of PEX-A (cross-linked polyethylene—A) tubing is expanded with tools to increase the inner diameter of the end of the tubing, so the tubing may be pushed over barbed connectors, with the PEX-A material being used because it has sufficient shape memory and elastic deformation to shrink back down to its original inner diameter and form a fluid seal with any enclosed barb(s) as the tubing returns to its original size. The expansion step, followed by the coupling step when the tube and fitting are mated, followed by contraction of the previously expanded tube, is a multi-step process that is time consuming, requires special tools to expand and possibly mate the parts, and is limited to tubing with suitable plastic deformation and memory characteristics. There is thus a need for a tubular line connector which avoids expansion tools, and which may be used with a wide variety of tubing materials.

Existing tubular connectors sometimes appear to properly connect two tubes, but because some internal seal is not properly aligned the connector will leak during use, or because some internal part is not properly engaged the connector will leak or even separate under pressure. There is thus a need for an improved connector that allows the installer to visually verify the connection is correctly assembled. Further, the imperfect connections sometimes leak slowly, with the leak rate escalating over time so the connector failure occurs after testing is completed. There is thus a need for a connector that will readily leak if the connection is not achieved, so the leaky connector may be readily identified and the connection fixed. Also, fixing a leaky connector may require removing and replacing the connector parts which may require draining the system of all liquids at great expense and effort. There is thus a need for a connector that readily leaks if not properly connected, and that may be corrected without removal.

Existing tubular connectors may require one or both ends of the connected tubes to be square, meaning the end is cut orthogonal to the longitudinal axis of the tube. A jagged end or slanted end may cause the connection to leak. There is thus a need for an improved connector that can join ends of tubes in a fluid tight connection when one or both ends are not square.

SUMMARY

In one aspect, an exemplary embodiment resides in a connector for a fluid line, the connector including a sleeve having a hollow portion at least partway therethrough, the sleeve including an engaging portion; a collet having an engaging part secured to the engaging portion; a grab part having one or more teeth configured to retain the fluid line, the teeth being located in the hollow portion; and a locking part having a locking portion, wherein the locking part is configured to move from a first position to a second position where the locking portion locks with a locking piece to assist with providing a structure that forms a fluid seal with the fluid line.

In an embodiment, the collet includes the locking piece.

In an embodiment, in the first position, the locking part is substantially adjacent to the grab part.

In an embodiment, the locking part is resiliently flexible.

In an embodiment, the locking part includes a sidewall having an opening at least part therealong to assist in expanding and contracting the locking part.

In an embodiment, the locking part is configured to contract and expand in order for the locking portion to lock with the locking piece.

In an embodiment, the locking portion includes a recess.

In an embodiment, the locking part includes a flange near the locking portion.

In an embodiment, the flange includes an inclined surface.

In an embodiment, the flange assists with moving the locking part from the first position, through the one or more teeth, and to the second position.

In an embodiment, the flange assists with moving the locking part past the locking piece.

In an embodiment, the locking part is retrained with the collet and moves substantially along a central axis defined by the collet.

In an embodiment, the locking part includes one or more guiding members.

In an embodiment, the one or more guiding members assist in centralizing the locking part in the collet.

In an embodiment, the one or more guiding members are configured to move along one or more parts of the collet.

In an embodiment, the collet includes an aperture such that in response to the locking part moving to the second position, the locking part is visible through the aperture.

In an embodiment, the engaging part includes a tab.

In an embodiment, the engaging portion includes an opening.

In an embodiment, the opening is in a wall of the of the sleeve.

In an embodiment, the tab is secured in the opening.

In an embodiment, the collet includes a base that rests against the sleeve as the engaging part is secured to the engaging portion.

In an embodiment, the sleeve includes one or more splines that are configured to assist in preventing rotation of the fluid line.

In an embodiment, the grab part is retained between a sleeve retaining ledge and an end of the collet.

In a further aspect, an exemplary embodiment resides in a fitting assembly for a fluid line, the fitting assembly comprising:
  a connector comprising:
    a sleeve having a hollow portion at least partway therethrough, the sleeve including an engaging portion;
    a collet having an engaging part secured to the engaging portion;
    a grab part having one or more teeth that are configured to retain the fluid line, the teeth being located in the hollow portion;
    a locking part having a locking portion; and
  a barbed connector having a barb, the barbed connector configured to be moved through at least part of the connector such that the barb engages with an internal portion the fluid line,
  wherein the locking part is configured to move from a first position to a second position where the locking portion locks with a locking piece to assist with providing a structure where the barb forms a fluid seal with the fluid line.

In an embodiment, the connector is as herein described.

In an embodiment, the barb forms the fluid seal with the fluid line by expanding at least part of the fluid line over the barb.

In an embodiment, the barbed connector is support by the locking part.

In an embodiment, the locking part is configured to expand as the barbed connector is moved therethrough.

In an embodiment, the barbed connector includes a second barb.

In an embodiment, the second barb is configured to engage with the locking part such that the barb connector is unable to be readily removed therefrom.

In an embodiment, the second barb engages a locking ledge of the locking part in order to be secured thereto.

In an embodiment, the barbed connector includes a flange that provides a stop to limit movement of the barb connect through the connector.

In an embodiment, the grab part assists in holding the fluid line in order to allow the barbed connector to be inserted through the fluid line.

In another aspect, a kit is provided for connecting one or more fluid lines, the kit comprising:
  a fitting assembly as herein described; and
  a fluid line.

In a further aspect, an exemplary embodiment resides in a connector in which a locking ring and contacting first fluid line move from a first, temporary position in which a catch on the assembly releasably holds the collet in the first position, to a second, locked position in which the locking ring is secured to the sleeve by a male and female snap fitting and the first fluid line is secured to the sleeve by the locking ring and housing, with the teeth of a grab ring preventing removal along the longitudinal axis. The sleeve may have the grab ring held inside the sleeve between an inward extending protrusion or preferably a ledge inside the sleeve and a collet that snap locks to the sleeve. The grab ring releasably engages the locking ring in the first position. The locking ring may be an annular structure with an axial slot to allow compression and insertion of the locking ring through the proximal end of the sleeve, after which the locking ring expands into an inner cavity with opposing proximal and distal ends smaller than the locking ring so as inhibit removal of the locking ring from the sleeve.

A first fluid line inserted through the proximal end of the sleeve pushes the locking ring to the second position where mating protrusions and recesses on the sleeve and locking ring form a snap-fit to retain the locking ring in the second position which encloses the end of the first fluid line. The locking ring prevents the first fluid line from passing through the sleeve in one direction and the grab ring has teeth engaging the first fluid line to prevent that fluid line from passing back out the sleeve through the proximal end into which the fluid line was inserted.

A barbed connector is provided to connect the sleeve and first fluid line assembly to other fluid lines. The barbed connector has first and second barbs, with the first barb closest to an end of the connector. When the barbed connector is in a first position the first barb engages the protrusion or ledge that held the locking ring in position while a first end is in fluid communication with the first fluid line to form a connection that leaks under normal household water pressures of about 50 psi to about 100 psi, and advantageously to form a connection that leaks at an even lower pressure of 10-20 psi (air or water). When the barbed connector is in a second position the first barb deforms a wall of the first fluid line outward to form a fluid tight seal, while the grab ring forces that wall inward. Advantageously, the proximal end of the sleeve is moved toward the barbed connector so the wall of the first fluid line slides over the inclined surfaces of the barbs to deform the wall of the first fluid line outward at the first barb while the second barb holds the locking ring in place so the locking ring prevents the end of the fluid line from moving past the locking ring, thus facilitating the wall of the first fluid line to bend outward.

Advantageously, an outwardly extending flange on the barbed connector and a flattened proximal end on the sleeve provide surfaces for the opposing jaws of a manually operated, pillars-like tool to engage the sleeve and barbed connector to move the parts together. The grab ring pushes the end of the first fluid line over the barbs as the sleeve and barbed connector move toward each other. Advantageously, the grab ring teeth jam the wall of the first fluid line against the first barb to form a fluid tight seal around a periphery of the first barb.

In more detail, there is advantageously provided a tubular slide connector for connecting at least a first fluid line, with the connector and first fluid line extending along a longitudinal axis. The slide connector includes a tubular sleeve having opposing first and second sleeve ends. A tubular collet is connected to the second sleeve end and extends along the axis. The connector has a grab ring with grab ring teeth extending inward and toward the second sleeve end. The grab ring is restrained in its motion along the axis by the collet and an inwardly extending ledge on the sleeve. The connector also has a locking ring having a first position in which the locking ring is releasably held at the first sleeve end by the grab ring. The locking ring has a second position in which the locking ring is held at the second sleeve end by the collet and a distal end of the first fluid line which contacts the locking ring and which fluid line is held by the grab ring teeth.

In further variations, this tubular slide connection may include a barbed connector having first and second barbs located between a first barbed connector end and a connector flange with the first barb closer to the first barbed connector end than is the second barb. The barbed connector advantageously has a first position with the first barb releasably engaging the locking ring. The barbed connector also advantageously has a second position with the second barb engaging the locking ring and the first barb sealing against an inside of a deformed first fluid line with the first barbed connector end inside the first fluid line.

In still further variations, the collet may have a second collet end contacting the first sleeve end to restrain axial motion of the sleeve past the collet. The collet may also have a snap-fit assembly to the first sleeve. The collet may also have a notch through which the locking ring may be seen when the locking ring is in the second locking ring position. The first sleeve may have a sleeve opening through which a portion of the collet engaging the sleeve opening may be seen from outside the sleeve.

There is also advantageously provided a tubular connector extending along a longitudinal axis, where the tubular connector includes a tubular outer sleeve having opposing first and second sleeve ends encircling the longitudinal axis. The connector has a grab ring (grab part) inside the outer sleeve and intermediate the first and second sleeve ends and centered around the longitudinal axis. The grab ring has a plurality of teeth inclined inward toward the longitudinal axis and toward the second sleeve end. The connector also has a generally cylindrical collet extending along the longitudinal axis. The collet has opposing first and second collet ends, with the second collet end adjacent the second sleeve end. The collet is located inside the outer sleeve and fastened to the outer sleeve. The connector further has a locking ring (locking part) at least partially inside the collet and movable along the longitudinal axis between a first position at the first collet end and a second position at the second collet end. The locking ring releasably engages the grab ring teeth in the first position and not engaging the grab ring teeth in the second position.

In further variations, the tubular connector may include a fluid tube for carrying fluid during use, with the tube passing through the first sleeve end along the longitudinal axis and contacting the locking ring in the second position and with the grab ring teeth advantageously engaging the tube to resist removal of the tube along the longitudinal axis from the first sleeve end. The tubular connector may further include a barbed connector connected to the fluid tube in a leaky manner. The barbed connector advantageously has opposing, first and second barbed connector ends and forms a fluid passage extending along the longitudinal axis between the first and second barbed connector ends. The barbed connector may have a first connector flange extending outward relative to the longitudinal axis, with first and second barbs between the first flange and the first barbed connector end. The first and second barbs are spaced apart along the longitudinal axis and extend outward and each has a conical surface facing toward the first barbed connector end, with the first barb being closer to the first barbed connector end than is the second barb. The first barb engages the locking ring while the first barbed connector end is inside the tube. The barbed connector engages the tube in a manner that allows water or air to leak past the first barb when the tube is pressurized at low pressures of 10-20 psi.

The tubular connector may also include this same barbed connector in a second barbed connector position to provide a connection with the fluid tube that does not leak. In this non-leaking, or sealed connection, the second barb engages the locking ring while the first barb deforms the tube outward at a location between the grab ring and the second collet end to form a fluid tight connection between the tube and the first barb around a periphery of the first barb sufficient to prevent water from leaking past the first barb when the tube contains water or air at 50 psi and advantageously does not leak past the first barb when tested with air at a qualifying pressure that can vary widely with the particular type of fluid tube and application. For purposes of description, the connection will not leak at water or air pressures of 150 psi. Advantageously, the first connector flange contacts the second end of the collet when the barbed connector is in the second barbed connector position and that contact may provide a visual confirmation that the parts are correctly connected and the connection should be fluid tight.

In a further embodiment, there is also provided a kit for connecting two tubes, where the kit includes any of the unassembled, sleeves, grab rings, collets, and locking rings, and advantageously also includes any of the barbed connectors and fluid lines or fluid tubes. The kits may be assembled on site by a user to form at least one first fluid line with the connector connected to the end of that first fluid line. The barbed connector may then be connected to the connector to provide a fluid tight connection. A second fluid line may be connected to a second connector and connected to another portion of the barbed connector having the first and second barbs.

In these kits, the connector advantageously has the locking ring held in the second position by the collet, the first fluid line and the grab ring teeth, all within the tubular sleeve. The tubular barbed connector may include a first barbed connector end and an outwardly extending, first connector flange and first and second barbs located between the first connector flange and the first barbed connector end, the first barb being located closer to the first barbed connector end than is the second barb, the first and second barbs spaced far enough apart so the second barb engages the locking ring ledge when the first barb is adjacent a distal end of the teeth when the locking ring is in the second position. In further variations, the barbed connector has a longitudinal axis with a first outer diameter between the first connector flange and the first barb and has a second outer diameter between the first barb and the first barbed connector end. The first outer diameter is larger than the second outer diameter. Moreover, the barbed connector advantageously has a fluid passage with a substantially constant inner diameter extending along the longitudinal axis of the barbed connector from the first connector flange to the first barbed connector end. The barbed connector may be one of a straight-line coupling, a T coupling, an elbow coupling or a blind end coupling, or a coupling changing diameter at one or more of the barbed connector body.

In another embodiment, there is also provided a fitting assembly for connecting first and second fluid lines. The assembly may include a connector extending along a longitudinal axis, where the assembly may include a tubular sleeve having opposing, proximal and distal sleeve ends joined by a sleeve sidewall that encircles the longitudinal axis with at least one locking sleeve opening extending through the sleeve sidewall. The proximal sleeve end has a cylindrical inward facing sleeve surface and a sleeve retaining ledge on an inner surface of the sleeve. The sleeve ledge is located between the at least one locking sleeve opening and the proximal sleeve end and extends inward toward the longitudinal axis.

The connector advantageously includes a grab ring inside the sleeve and encircling the longitudinal axis. The grab ring has a grab ring base with a plurality of teeth extending from the base toward the longitudinal axis and toward the distal sleeve end. The sleeve retaining ledge restricts movement of the grab ring along the longitudinal axis in on axial direction.

The connector also advantageously includes a collet inside the sleeve and encircling the longitudinal axis. The collet has proximal and distal collet ends joined by a collet sidewall with the proximal collet end having a collet base extending outward. The collet base has at least one collet notch extending radially through the collet base. The collet also has an inwardly extending collet flange encircling the longitudinal axis at the distal collet end adjacent the collet base. The collet may also have at least one locking tab extending outward from the collet sidewall to engage the at least one locking sleeve opening to restrain axial motion between the collet and sleeve. The collet may further have at least one elongated collet slot extending along at least a substantial axial length of the collet sidewall.

The connector further includes a locking ring encircling the longitudinal axis and having opposing proximal and distal locking ring ends. The locking ring may have an outwardly extending, cylindrical base at the proximal locking ring end and an inclined locking flange at the distal locking ring end inclined outward and toward the proximal locking ring end. The locking ring may have an engaging recess facing outward and located between the locking ring base and the inclined locking flange. The inside of the locking ring base may have an inner locking ring ledge. The locking ring may also have an axial locking ring slot extending along an axial length of the locking ring to allow the locking ring to reduce its diameter to fit through the proximal sleeve end when compressed. The locking ring is movable between a first position in which an outer surface of the locking ring base contacts the inward facing sleeve surface at the proximal sleeve end while the grab ring teeth are in the engaging recess in the locking ring, and a second position where the engaging recess in the locking ring contains the inwardly extending collet flange.

In further variations of the fitting assembly, the connector may have the locking ring in the first position, or in the second position. The locking ring slot advantageously has a projection on each opposing side of the locking ring slot which projections extend toward each other and are located at the proximal end of said locking ring slot. The assembly may further include the locking ring may in the second position with a distal end of the first fluid line contacting at least a portion of the locking ring base, and with the outer diameter of the first fluid line being sufficiently large that the teeth of the grab ring are resiliently urged against an outer surface of the first tube to resist movement of the distal end of the first fluid line away from the locking ring along the longitudinal axis. In still further variations, a wall of the first fluid line is deformed outward toward the collet sidewall at a location between the distal end of the first fluid line and the teeth of the grab ring. The locking ring base may have an inside surface that is inclined inward and toward the proximal locking ring end, with that inclined surface extending to the proximal end of the locking ring.

The fitting assembly may also advantageously include a tubular barbed connector having a first barbed connector end and an outwardly extending, first connector flange and first and second barbs located between the first connector flange and the first barbed connector end. The first barb is located closer to the first barbed connector end than is the second barb. The first barbed connector end is inserted into the distal sleeve end so that a portion of the first locking ring extending between the distal locking ring end and the inner locking ring ledge is located between the first and second barbs while the first barb engages the inner locking ring ledge, with the first barbed connector end extending inside the distal end of the first fluid line. The fitting assembly may leak when fluid flow through the barbed connector is blocked at the first connector flange to form a closed system, and with the first fluid line pressurized with water or air at 50 psi.

The fitting assembly may have the same tubular barbed connector but in a different connection with the connector, and in which the second barb engages the inner locking ring ledge while the first barb deforms a wall of first fluid line outward as the teeth of the grab ring resiliently urge the wall of the first fluid line inward, and with the first barbed connector end extending inside the distal end of the first fluid line. In this fitting assembly, the barbed connector end may extend inside the inward facing sleeve surface and that inward facing sleeve surface may be in contact with or immediately adjacent to the outer surface of the first fluid line. Advantageously, this fitting assembly does not leak when fluid flow through the first barbed connector is blocked at the first connector flange and the first fluid line is pressurized with water or air at 50 psi and preferably not leak at 150 psi. Advantageously, the locking ring is visible through the at least one collet notch in the collet base. Preferably, the collet base contacts or is immediately adjacent to the first connector flange in this assembly that does not leak.

In further variations, the fitting assembly may have the at least one locking tab visible from an outside of the sleeve when the locking tab engages the locking sleeve opening. The locking ring is also advantageously visible through the collet notch in the collet base when the locking ring is in the second position. Advantageously, the first barb has a sharp outer peripheral edge, while the second barb has a flat outer peripheral edge and provides more shear resistance along the longitudinal axis than does the first barb, so the first barb provides a fluid tight seal while the second barb resists axial movement relative to the fluid line.

The barbed connector may have a first outer diameter between the first connector flange and the first barb and a second outer diameter between the first barb and the first barbed connector end, with the first outer diameter larger than the second outer diameter. The barbed connector advantageously has a fluid passage through the barbed connector that has a substantially constant inner diameter extending along the longitudinal axis of the barbed connector from the first connector flange to the first barbed connector end. Because a fluid tight seal is provided between the first barb and the fluid line, fitting assembly has no O-ring type seal encircling the longitudinal axis of the connector or of the barbed connector. As used herein, an O-ring type seal includes a ring of resilient material such as rubber or suitable elastomers, where the encircling ring may have various cross-sectional shapes, such as a circular cross-section to form an O-ring, a D-cross-section to form a D-ring, a square cross-sectional shape, or other cross-sectional shapes.

BRIEF DESCRIPTION OF THE DRAWINGS

By way of example only, certain embodiments of the invention will be described more fully hereinafter with reference to the accompanying figures, in which like numbers refer to like parts throughout, wherein.

DETAILED DESCRIPTION

Figure 1:
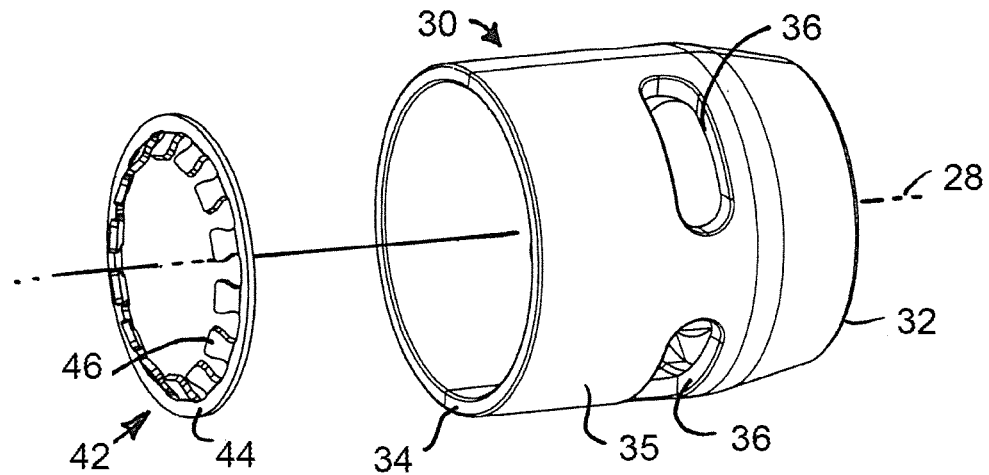
FIG. 1 is an exploded perspective view of a sleeve and a grab part of a connector, according to an embodiment.

As used herein, proximal refers to the relative position or direction toward the fluid line before the fluid line is connected. Distal refers to the relative position or direction away from the fluid line before the fluid line is connected. The relative positions or directions inward and outward, inside and outside are with respect to the longitudinal axis during use. As used herein, the reference to fluid lines refers to tubes having an outer wall defining a fluid passage through which fluid passes during use of the fluid line. Unless specified otherwise, fluid includes liquids and gases.

Referring to FIGS. 1-11, a fitting assembly 20 may have various components depending on whether the first and or second fluid lines 22, 24, respectively, are considered part of the assembly 20, and whether barbed connector 120 joins two or more fluid lines or plugs a fluid line, is considered part of the fitting assembly 20. Each fitting assembly 20 includes a connector 26 shown in FIGS. 1-6. The connector 26 includes a sleeve in the form of tubular sleeve 30, a grab part in the form of grab ring 42, a collet 50 and a locking part in the form of locking ring 80.

Figure 2:
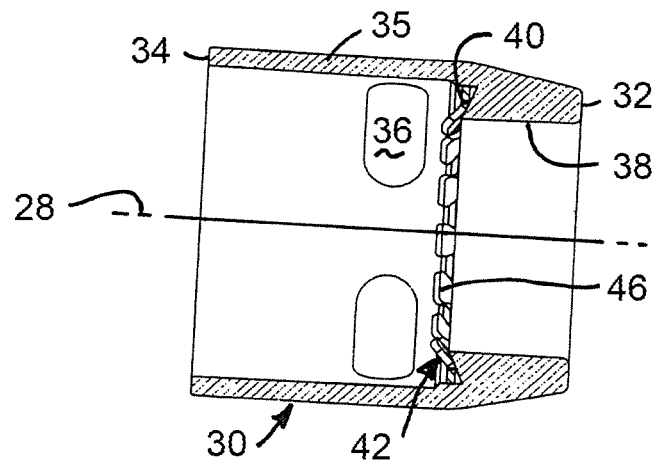
FIG. 2 is a sectional view taken along the longitudinal axis and showing the grab part in the sleeve of FIG. 1, according to an embodiment.
Figure 3:
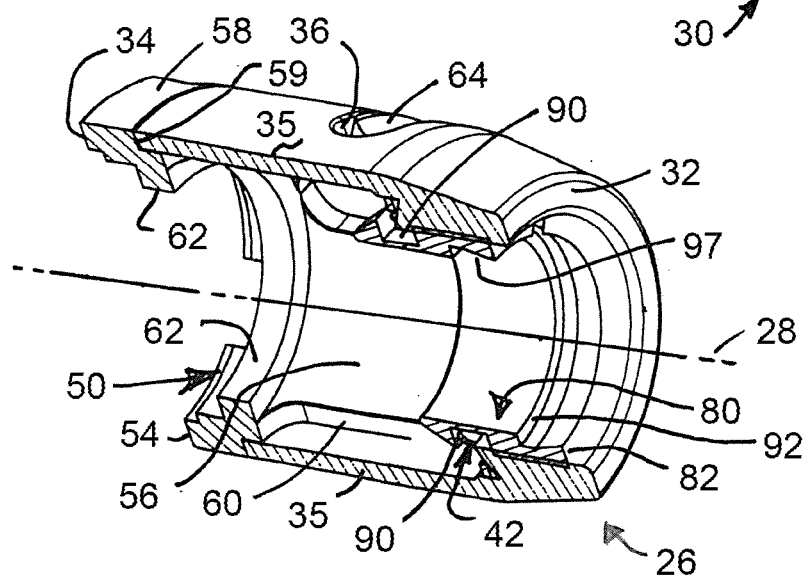
FIG. 3 is a sectional perspective view taken along the longitudinal axis and showing the connector, according to an embodiment, having a collet and grab part in the sleeve and a locking part in a first position in the sleeve.
Figure 4:
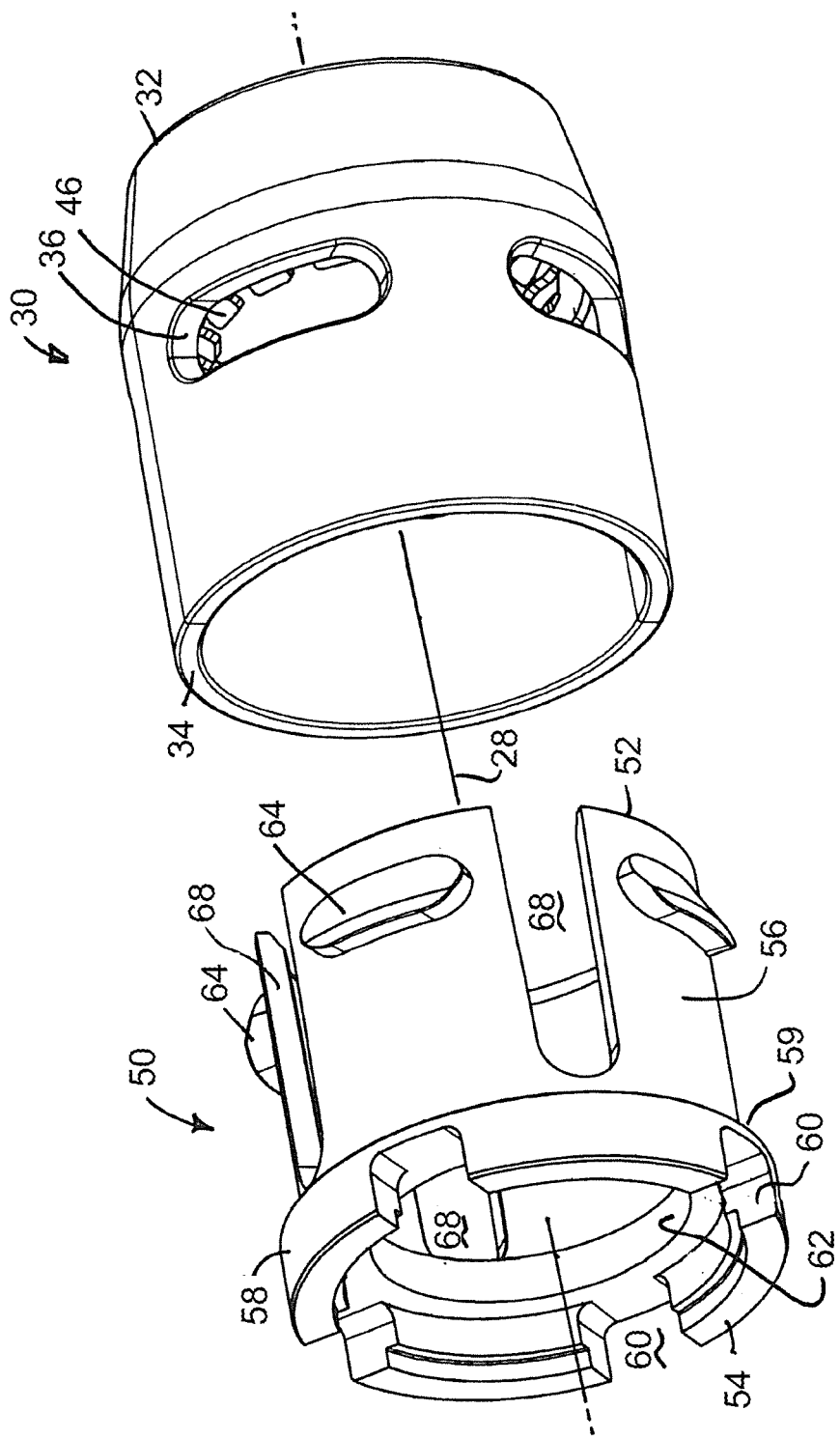
FIG. 4 is an exploded perspective view of the collet and the sleeve that contains the grab part, as shown in FIG. 3, according to an embodiment.

As shown in FIGS. 1-2, the tubular sleeve 30 extends along longitudinal axis 28. The sleeve 30 has opposing proximal and distal sleeve ends 32, 34, respectively, with the proximal end 32 advantageously, but optionally, having a generally flat surface orthogonal to the longitudinal axis 28. A sleeve sidewall 35, which is generally cylindrical, extends between the sleeve ends 32, 34. One or more engaging portions in the form of locking sleeve openings 36 may extend at least part way through and preferably all the way through the sidewall 35, with four such openings 36 being shown. While the depicted locking sleeve openings 36 have a generally rectangular shape with rounded ends, it should be appreciated that other shapes openings may be used. The locking sleeve openings 36 are shown being equally spaced around a circumferential line of the sleeve 30, but the spacing may vary.

As noted above, the sleeve 30 is tubular in this embodiment and, as such, has an inner surface facing toward the longitudinal axis 28. Advantageously, the proximal end 32 of the sleeve 30 has an inward facing sleeve surface 38 that is generally cylindrical and sized to be about the same diameter as the outer diameter of the first fluid line 22 and centered around the longitudinal axis 28. A sleeve retaining ledge 40 extends around an inner circumference of the sleeve 30 at the distal end of the inward facing sleeve surface 38. The sleeve retaining ledge 40 may be orthogonal to the longitudinal axis 28, or inclined inward and toward the distal end 34 of the sleeve 30 as best seen in FIGS. 2 and 6-10. The sleeve retaining ledge 40 is shown inclined at an angle of about 25° from an orthogonal plane to the longitudinal axis 28 and toward the distal end 34 of the sleeve 30. An inclined sleeve retaining ledge 40 may offer possible support to the grab ring 42 abutting the inclined ledge as described later, but that is optional and is believed to depend on the flexibility of the grab ring 42 and its parts.

With the above in mind, the grab ring 42 rests against the sleeve retaining ledge 40 so the ledge 40 prevents the grab ring 42 from moving axially past the ledge 40. The grab ring 42 is annular, having a circular grab ring base 44 with a plurality of grab ring teeth 46 extending therefrom at an angle. The base 44 is preferably, but optionally, an annular ring with no slot. The grab ring 42 is typically a separate part held in place between the sleeve 30 and the collet 50, but as described later, could be integrally formed as part of the sleeve 30 or collet 50. In some embodiments, it will be appreciated that a grab ring may be either as a separate part or an integrated component.

The annular grab ring base 44 has a diameter that is greater than its depth. In this regard, the annual base 44 forms a generally rectangular cross-section in a plane that is orthogonal to the longitudinal axis 28. The teeth 46 extend at an angle of about 40° from the plane of the grab ring base 44. Fourteen teeth 46 are shown (FIG. 1), but the number varies with the diameter and construction of the fluid lines 22, 24. The teeth 46 have inwardly directed, distal ends that are generally straight or slightly concave as the distal ends of the teeth 46 engage the outer surface of the fluid lines 22, 24. This allows the fluid lines 22, 24 to pass through the grab ring 42 and its teeth when moving along the axis 28 in the direction in which the teeth are inclined, and to restrain movement of the fluid lines in the opposing direction along axis 28. The grab ring teeth 46 are sufficient in number and have a sufficient width at the distal end of the teeth 46 to advantageously provide a substantially uniform, circumferential force resisting movement of the engaged fluid lines 22, 24 in the direction opposite the direction in which the teeth 46 are inclined.

Still referring to FIGS. 1-11, but especially to FIGS. 3-6, the sleeve 30 advantageously receives a collet 50 inside the sleeve 30 in an interlocking connection. The collet 50 has opposing proximal and distal collet ends 52, 54, respectively joined by a collet sidewall 56. A base 58 is at the distal collet end 54. The collet base 58 is advantageously stepped to form an outer step or ledge 59, with the distal end 34 of the sleeve 30 contacting or resting against the outer step 59 when the collet 50 and sleeve 30 are interlocked. The collet base 58 advantageously has at least one, and preferably several apertures in the form of notches 60 extending through the base 58 so that a user can look through the notch 60 and see if other components are visible inside the collet 50 and sleeve 30. Four notches 60 are shown, but the number may vary, although three or four notches are preferred. The notches 60 are shown as generally rectangular openings with one open side on the rectangle, giving a crenelated appearance to the distal end 34 of the collet 50.

Extending inward from the collet base 58 at the distal end of the collet 50, is a locking portion in the form of collet flange 62. The collet flange 62 is shown as having a generally rectangular cross-sectional shape. As described later, the collet flange 62 interlocks with another part from the locking part 80.

The collet 50 and sleeve 30 are advantageously interlocked, preferably with an engaging portion on one part and an engaging part on the other part. To further elaborate, a plurality of axially extending, closed ended, collet slots 68 extending from adjacent the base 58 to the proximal end 52 of the collet 50. The closed ends of the slots 68 are adjacent the base 58, so the portions of the collet sidewall 56 between the collet slots 68 form flexible members having engaging parts in the form of locking tabs 64. The locking tabs 64 are located toward the proximal end 52 of the collet and extending outward toward the sleeve 30, with the locking tabs 64 located and sized to mate with an engaging portion in the form of the locking recess 36 in the sleeve 30. The collet slots 68 allow the locking tabs 64 and segments of the sidewall 56 to resiliently bend inward so the proximal end 52 of the collet and the locking tabs 64 can be inserted into and through the distal end 34 of the sleeve 30. The proximal end 52 of the collet 30 may be inclined to make it easier to insert the proximal end 52 into the sleeve 30, with the drawings showing an inclined, inwardly facing surface on the proximal end 52. When the male locking tabs 64 on the collet 50 align with the female openings 36 in the sleeve 30 they interlock, and this preferably occurs when the distal end 34 of the sleeve 30 contacts the outward flange 59 of the collet 50. As is apparent, the locking tabs 64 mating openings 36 could be on the opposite opposing parts and still interlock the sleeve 30 and collet 50. The locking tabs and sleeve openings form interlocking male projections and female recesses. The interlocking male projections and female recesses could take other configurations, could be located elsewhere on the interlocked sleeve 30 and collet 50, and need not extend entirely through sidewall 35 or through sidewall 56.

The sleeve 30, grab ring 42, collet 50 and locking ring 80 combine to provide parts that may be separately or jointly manufactured very easily and cheaply, and that readily combine to form a connector 26. The grab ring 42 is too large in diameter to pass through the inward facing sleeve surface 38 of the sleeve 30, and small enough to pass through the distal end 34 of the sleeve 30. As noted above, the grab ring 42 is sized to fit through the distal end 34 of the sleeve 30 and rest against the sleeve retaining ledge 40, with the grab ring teeth 46 directed inward and toward the distal end 34 of the sleeve 30, so the grab ring 42 and its teeth 46 encircle the longitudinal axis 32. The proximal end 52 of the collet 50 is inserted into the open, distal end 34 of the sleeve 30, with the segmented sidewall 56 flexing inward to allow the locking tabs 64 to enter the sleeve 30. Accordingly, further to the above, when the outer step 59 of the collet contacts the distal end 34 of the sleeve 30, the locking tab 64 on the collet aligns with the opening 36 in the sleeve to form a snap lock connection as the bent sidewall 56 resiliently urges the locking tab 64 outward and into the opening 36. It may be necessary to rotate the collet 50 relative to the sleeve 30 to align the mating locking tab(s) 64 with the opening(s) 36.

Figure 6:
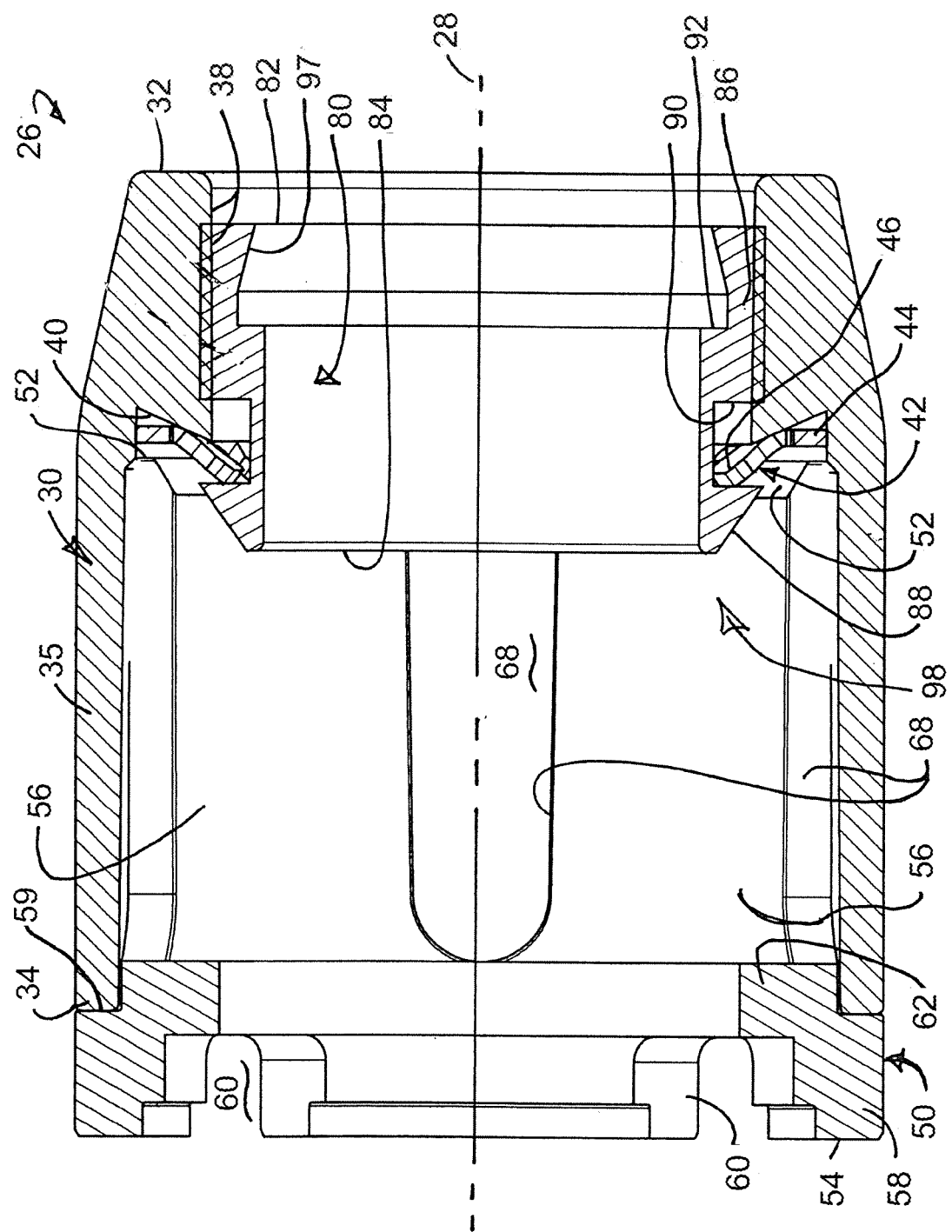
FIG. 6 is a sectional view taken along the longitudinal axis of the connector of FIG. 3, showing the sleeve, collet and grab part with the locking part in a first position in the sleeve.

As seen in FIG. 6, the proximal end 52 of the collet 50 is adjacent the base 44 of the locking ring 42 to restrict the locking ring 42 from moving axially out of the sleeve 30 through the distal end 34 of the sleeve 30. Advantageously, the inside of the sleeve 30 has a slightly larger diameter along the sidewall 56 of the collet 50 to form a slight recess into which the collet 50 fits when fully mated with the sleeve 30. The inward facing sleeve surface 38 thus restricts movement of the grab ring 42 toward the proximal end 32 of the sleeve 30, while the collet 50 restricts movement of the grab ring 42 in the opposite axial direction toward the distal end 34 of the sleeve 30. The grab ring 42 seats against the sidewall 35 of the sleeve 30 to restrain lateral movement of the grab ring 42. The inclined sleeve retaining ledge 40 restricts bending of the inclined grab ring teeth 46 toward the proximal end 32 of the sleeve 30. The sleeve 30 and collet 50 may be made of suitably strong plastic or of metal. The grab ring 42 is preferably made of metal, with stainless steel preferred. The sleeve 30, grab ring 42 and collet 50 provide a three-part connector 26 that positions the grab ring 42 in a desired location for use as described herein.

Figure 5:
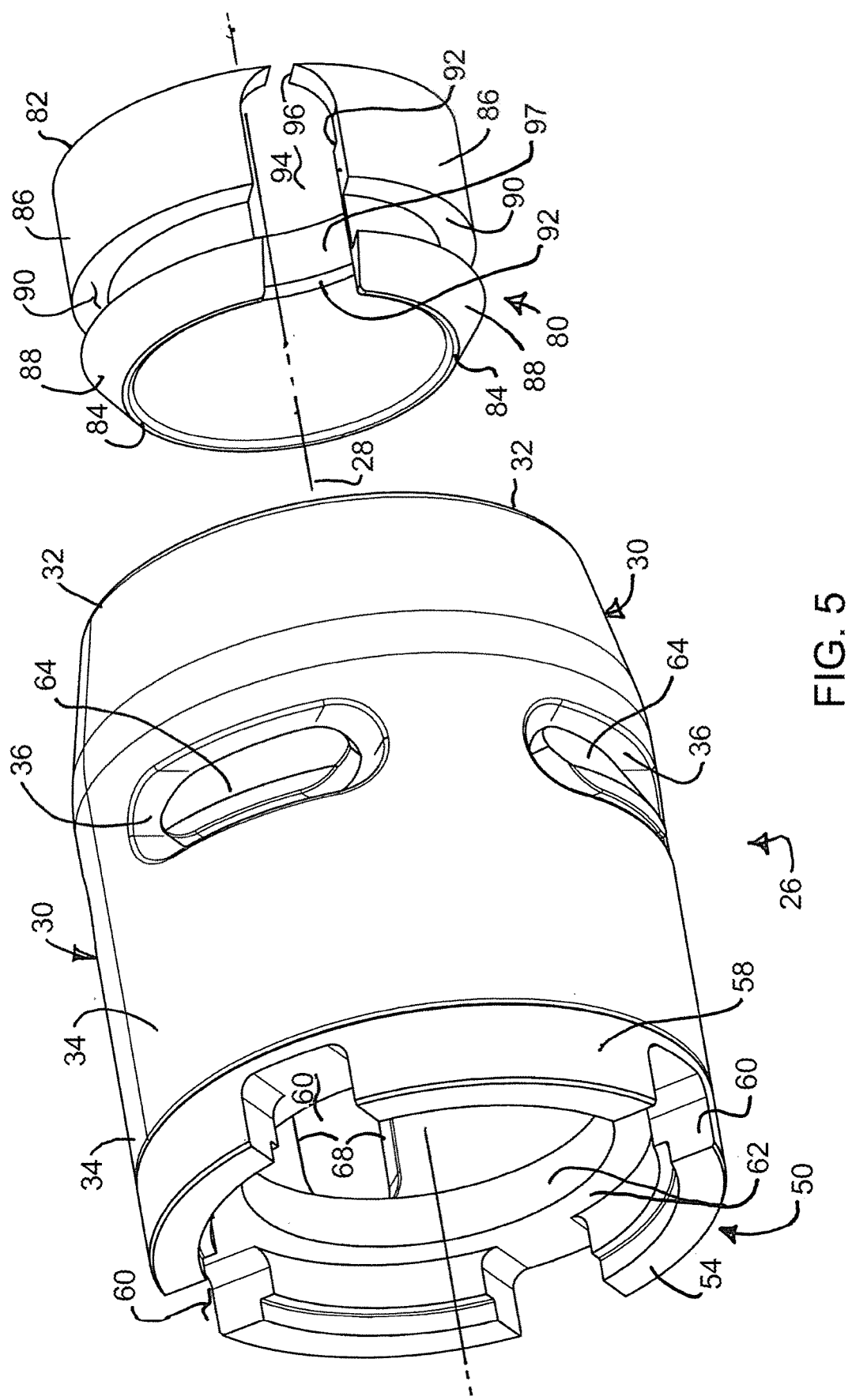
FIG. 5 is an exploded perspective view of the sleeve and collet, without the locking part inserted into the proximal end of the sleeve, according to an embodiment.
Figure 7:
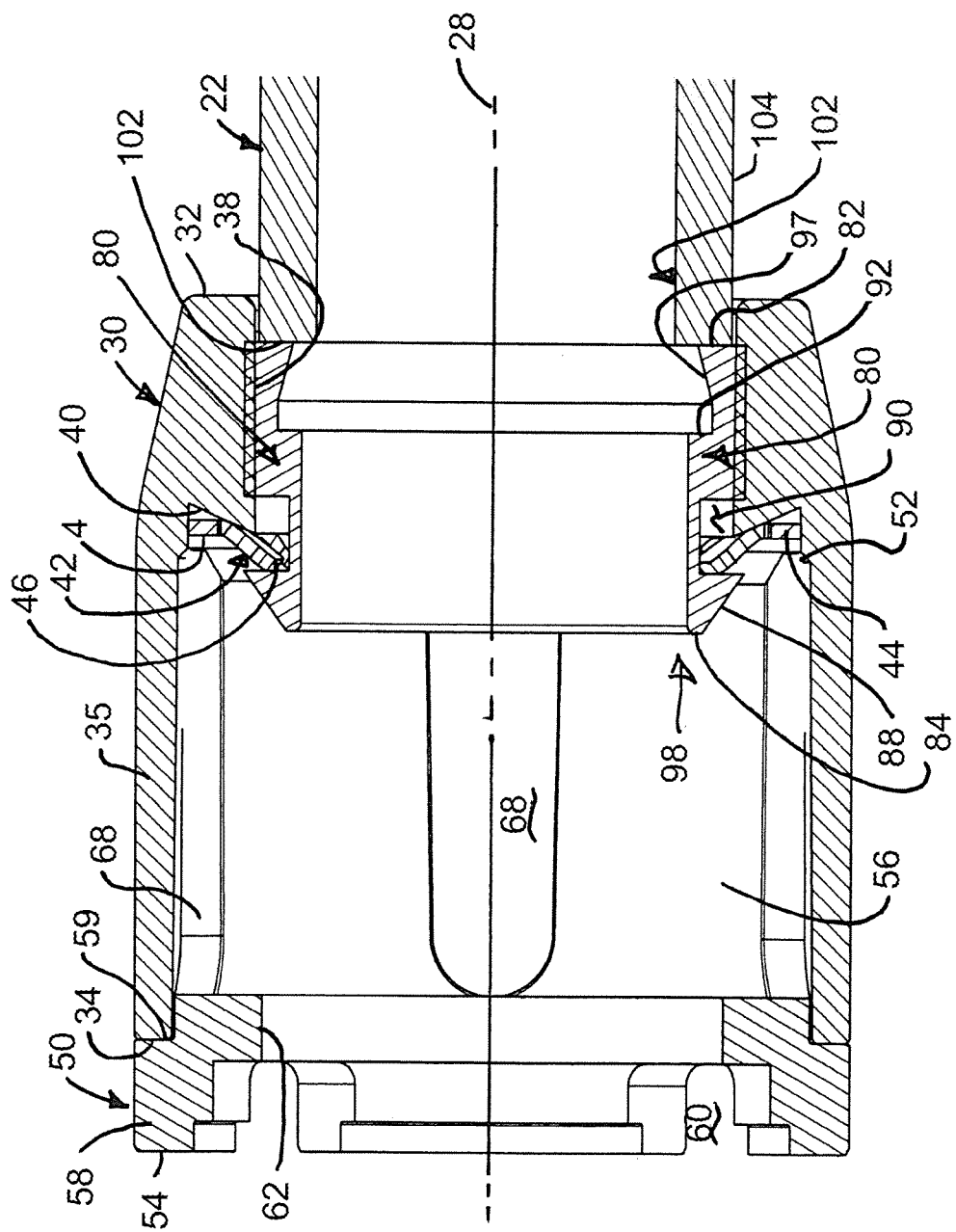
FIG. 7 is a sectional view taken along the longitudinal axis of the connector of FIG. 6, with a first fluid line contacting the proximal end of the locking part in the first position of the locking part.

Referring to FIGS. 1-11, and especially FIGS. 5-7, locking ring 80 has proximal and distal locking ring ends 82, 84, respectively. The locking ring 80 is a slotted, annular structure extending along the longitudinal axis 28. The locking ring 80 has a base in the form of a locking ring base 86, on its proximal locking ring end 82. The locking ring 80 also has a flange in the form of locking flange 88, on its distal locking ring end 84. The locking flange 88 has an outwardly facing surface that is inclined inward and toward the distal end 84 of the locking ring 80, and that advantageously extends to the distal end 84. A locking portion in the form of an engaging recess 90 encircles the locking ring 80 at an axial location between the flange 88 and the base 86. The engaging recess 90 is advantageously located at the end of the inclined surface of the locking flange 88 so the locking flange 88 forms a barb. The inner surface of the locking ring 80 has an inner locking ring ledge 92 facing toward the proximal end 82 of the locking ring 80. The inner locking (ring) ledge 92 is preferably in a plane transverse to the longitudinal axis 28. In this embodiment, the inner lock ledge 92 is substantially orthogonal to the longitudinal axis 28. Between the inner locking ring ledge 92 and the proximal end 82 of the locking ring 80 is an inward facing, inclined surface 97. The inward facing surface 97 is inclined inward and toward the locking ring 80 proximal end 82, and preferably extends to that proximal end 82. A cylindrical surface may separate the inner locking ring ledge 92 from the distal end of the inward facing, inclined surface 97 on the locking ring 80.

Typically, the locking ring 80 is made of resilient plastic and manually squeezed inward to compress the slot 94 in the locking ring 80 so the locking ring 80 can fit through the inward facing surface 38 in the proximal end of the sleeve 30 and then expand. The locking flange 88 on the distal end of the locking ring 80 has an inclined outer surface inclined to make it easier to align and insert the locking ring 80 into and through the generally cylindrical, inward facing sleeve surface 38. The inclined outer surface on the locking flange 88 passes through the circular opening formed by the distal ends of the teeth 46 of the grab ring 42. The locking ring slot 94 allows the grab ring teeth 46 to compress the locking flange 88 to fit through the grab ring teeth 46, and the grab ring teeth 46 are inclined in the same general direction as the outer surface on locking flange 88 so the teeth 46 may flex outward to allow passage. However, once the locking ring teeth 46 of the grab ring 42 pass the end of the locking flange 88, they are resiliently urged inward to enter the engaging recess 90 of the locking ring 80 and to releasably hold the locking ring 80 in a first position.

The engaging recess 90 advantageously allows some slight axial motion of the locking ring 80 along the longitudinal axis 28 as the teeth 46 allow a slight movement parallel to longitudinal axis 28 within the engaging recess 90. That said, the distal ends of the grab ring teeth 46 are inside the engaging recess 90 and abut the distal sidewall forming the engaging recess 90 if the locking ring 80 moves toward the proximal end 32 of the sleeve 30. The grab ring teeth 46 are also stiff enough that they resist movement in the opposing axial direction along which the teeth 46 are inclined, although if enough force is applied the teeth 46 may be flexed inward to allow further axial motion. Thus, the locking ring 80 is restrained from being withdrawn out of the proximal end 94 once the locking flange 88 passes the grab ring teeth 46 and the teeth enter the engaging recess 90, but the locking ring 80 may move along axis 28 toward the distal end of the sleeve 30 and collet 50 if enough axial force is applied to resiliently flex the teeth 46 inward and allow axial movement of the locking ring 80 toward the distal end of the sleeve 30 and collet 50.

The locking ring slot 94 allows the locking ring 80 to act as a circumferential spring so the locking ring base 86 is resiliently urged outward against the inward facing surface 38 to also releasably hold the locking ring 80 in the first position. The double-cross-hatched area in FIGS. 6-7 along the juncture of the locking ring base 86 and the inward facing sleeve surface 38 reflects the overlap of the uncompressed locking ring base 86 and that inward facing sleeve surface 38. That outward expansion also urges the locking flange 88 on the distal end of the locking ring 80 to expand outward so the grab ring teeth 42 enter the engaging recess 90. Advantageously, the proximal end 82 of the locking ring 80 is slightly inside the sleeve 30 and the inward facing surface 38 of the sleeve 30 when the locking ring 80 is in the first position with the grab ring teeth 42 in the engaging recess 90. The connector 26 may include the locking ring 80 in the first position 98 shown in FIGS. 6-7 but it would be appreciated that other first positions are available.

Figure 8:
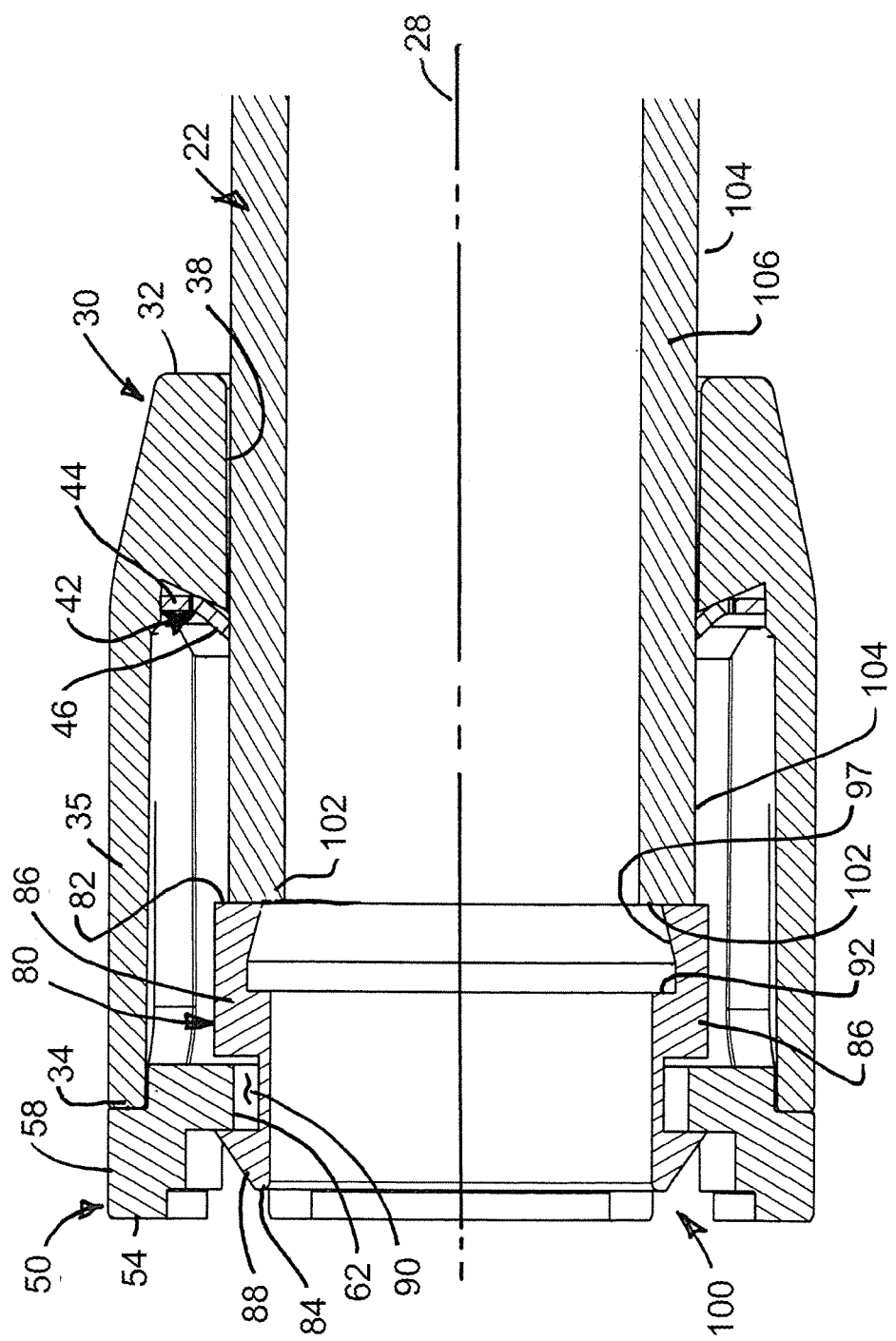
FIG. 8 is a sectional view taken along the longitudinal axis of the connector with the first fluid line contacting the retain proximal end of the locking part in a second position of the locking part.

Referring to FIGS. 1-11 and especially to FIGS. 7-8, the locking ring 80 is movable between a first position 98 (FIG. 7) and a second position 100 (FIG. 8). As noted above, the first position 98 may include the locking ring 80 resiliently held as shown in FIG. 7. The first position may also include a first position of the fluid line 22 in which the distal end 102 of the fluid line 22 contacts the locking ring proximal end 82 as shown in FIG. 7. The second position 100 of the locking ring 80 within the sleeve 30 is achieved when the distal end of a fluid line 22 pushes the locking ring 80 from the proximal end of the sleeve 30 to the distal end of that sleeve 30.

The inward facing sleeve surface 38 is about the same size or diameter as the outer surface 104 of the first tube 22 so that by pushing the first tube into the sleeve 30, the locking ring base 86 pushes through and spread apart the teeth 46 of the grab ring 42 and allow the locking ring 80 to pass through the grab ring 42. The outer diameter of the locking flange 88 and locking ring base 86 are preferably smaller than that inner diameter of the collet sidewall 56 which guides the locking ring body toward the distal end 34 of the sleeve 30 and collet 50. Thus, as the distal end of the first fluid line 22 pushes the locking ring 80 through the sleeve 30 and collet 50, the locking ring 80 does not tilt, skew or cant enough to jam the locking ring 80 in the sleeve 30 and collet 50.

At the distal end 54 of the collet 50, the inclined surface on the retaining flange 88 is forced inward and through the smaller diameter collet flange 62, with the retaining flange expanding once the retaining flange 88 is past the collet flange—bringing the engaging recess 90 into axial alignment with the collet flange 62. As the inwardly compressed flange 88 expands outward, the locking ring's engaging recess 90 engages the aligned collet flange 62 as seen in FIG. 8 to interlock the locking ring 80 and the collet 50 which in turn is interlocked with the sleeve 30. The interlocking (i.e. the snap-fit of the collet flange 62 with the engaging recess 90) stops axial motion of the locking ring 80, and the fluid line 22 which is pushing the locking ring 80 into the interlocking position. The second position 100 of the locking ring 80 thus has the locking ring 80 locked in position at the distal end of the collet 50 and sleeve 30 and, via the teeth 46, it also has the fluid line 22 locked in position within the sleeve 30 and collet 50. Thus, the locking ring 80 prevents movement toward the barbed connector 120 and the grab ring 42 prevents removal of the fluid line 22 (or 24) from the connector 26.

The inwardly extending collet flange 62 represents a male projection on the collet 50, engaging a female recess 90 in the locking ring 80. In this configuration the female recess 90 is resiliently urged outward against the male member 62 to interlock the locking ring 80, collet 50 and sleeve 30. Other interlocking configurations may be used to interlock male projections with female recesses, including interlocking male parts on the sleeve 30 or collet 50 mating with female recesses on the locking ring 80, or outwardly extending male parts on the locking ring 80 engaging with female recesses on the collet 50 or the sleeve 30.

To further elaborate on the above, when the locking ring 80 is pushed into engagement with the distal end 54 of the collet 50, the first fluid line 22 is connected to the sleeve 30 and cannot move axially. The interlocking of the collet flange 62 with the engaging recess 90 on the locking ring 80 locks the locking ring 80 in position relative to the collet 50 and sleeve 30 and prevents the fluid line 22 from moving along the axis 28 past the locking ring 80 and collet 50 and out the distal end of either the collet 50 or sleeve 30. The grab ring teeth 46 resiliently engage the outer surface 104 of the first fluid line 22 and are inclined inward toward the proximal ends 34, 54 of the sleeve 30 and collet 50, and inclined inward toward the locking ring 80—so that the fluid line 22 is restrained from moving along the axis 28 out of the sleeve 30 and collet 50. The grab ring 42 also restrains the fluid line 22 from moving laterally or orthogonally relative to the longitudinal axis 28, as does the close fit between inward facing sleeve surface 38 and the outward facing wall 106 of the fluid line 22. Thus, when the fluid line 22 pushes the locking ring 80 into the second position as in FIG. 8, the fluid line 22 is permanently connected to the distal end of that fluid line 22.

The connector 26 may include the locking ring 80 in the second position, with the fluid line 22 locked in position within the sleeve 30 and collet 50. When the locking ring 80 and fluid line 22 are in the locked position, the locking ring 80 is visible through notch(es) 60 in the base 58 of the collet 50. That allows visual confirmation that the locking ring 80 is engaged. In the figures, the locking flange 88 is visible through the notch(es) 60, but the viewing openings could be located elsewhere through the collet 50, or through the sleeve 30 and collet 50.

Figure 10:
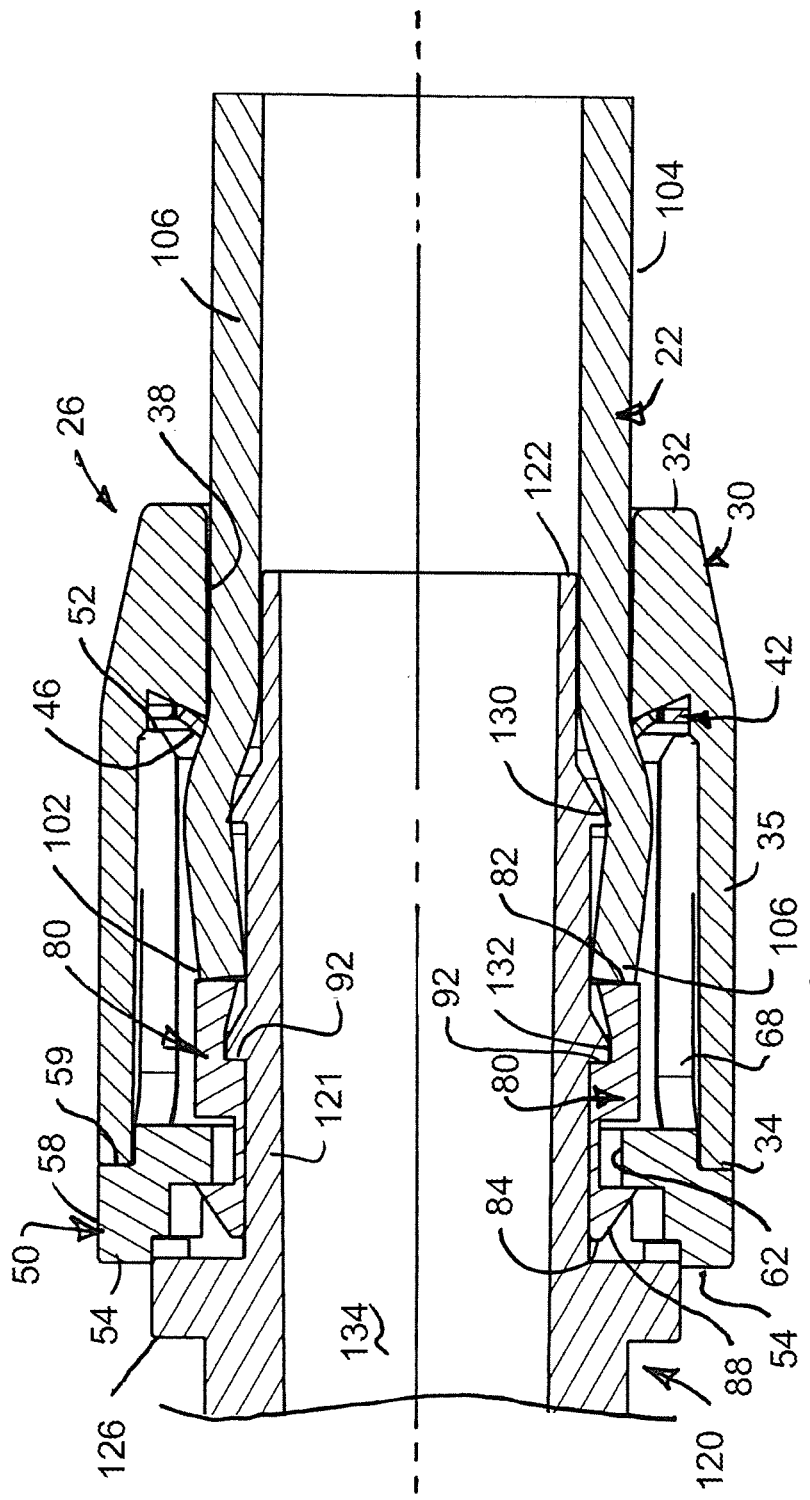
FIG. 10 is a sectional view taken along the longitudinal axis of the connector and the first fluid line of FIG. 8, with the barbed connector in a second position and deforming a wall of the first fluid line to form a fluid seal with the barbed connector.
Figure 11:
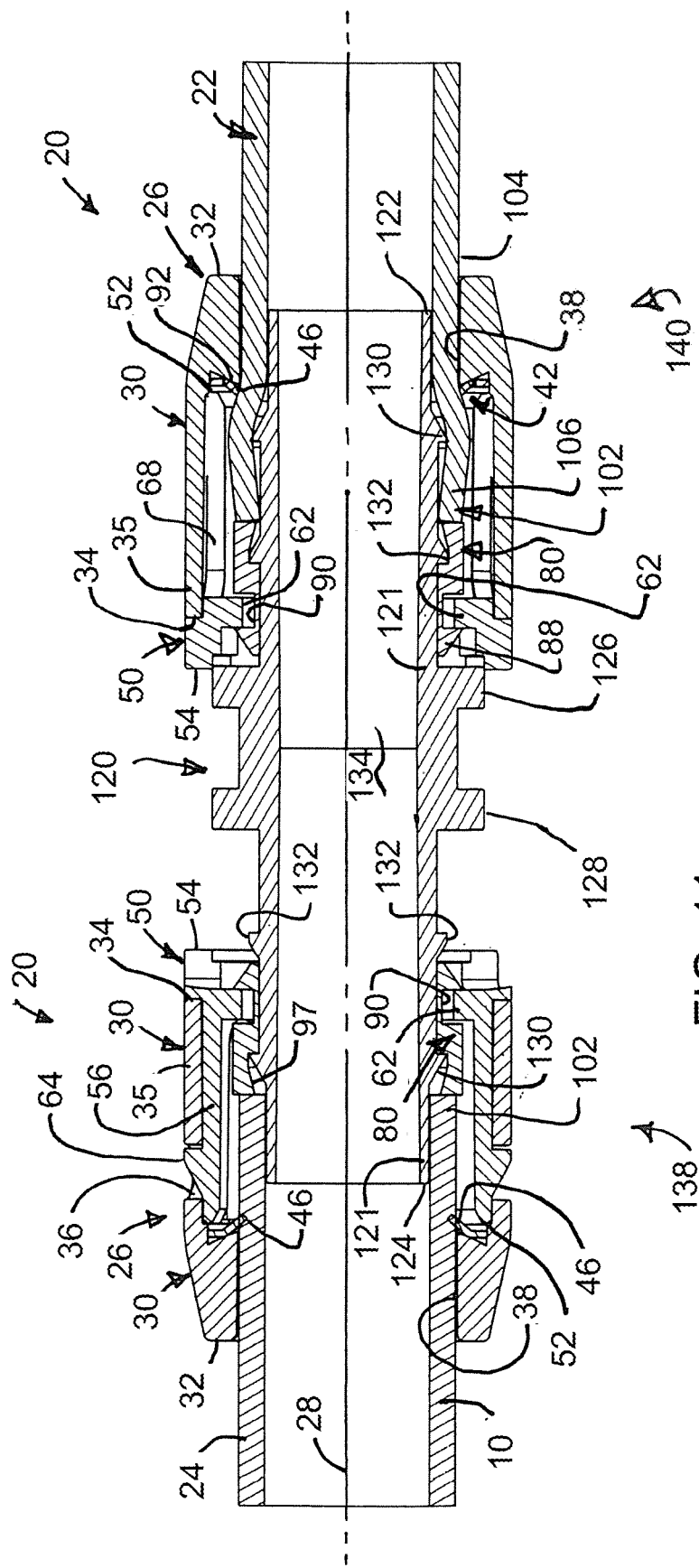
FIG. 11 is a sectional view taken along the longitudinal axis of the connector and first fluid line of FIG. 10, showing a second connector with a second fluid line contacting a second locking part in a first position, on the same barbed connector as the first connector and first fluid line.
Figure 12A:
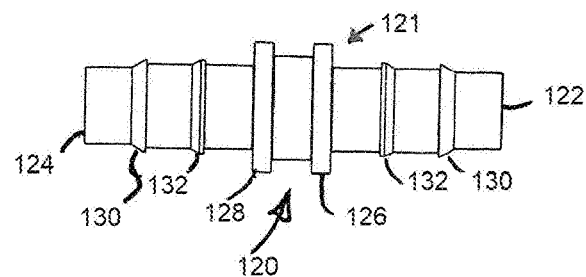
FIG. 12A shows an in-line barbed connector.
Figure 12B:
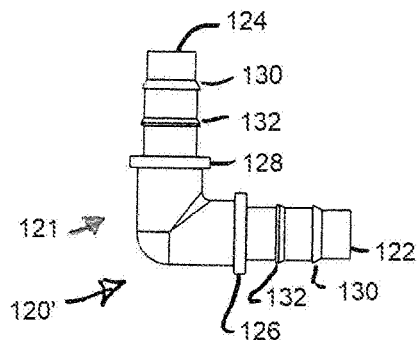
FIG. 12B shows an elbow barbed connector.
Figure 12C:
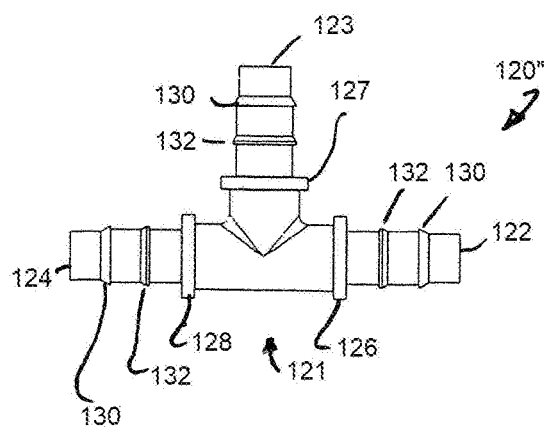
FIG. 12C shows a T barbed connector.
Figure 12D:
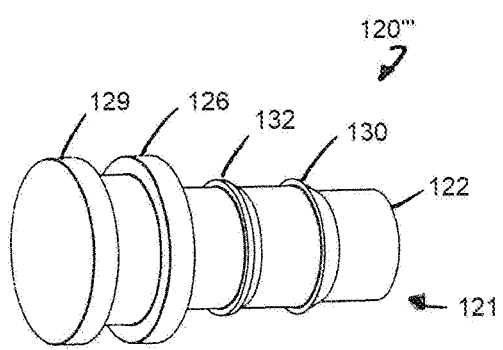
FIG. 12D shows a blind end or plug barbed connector.

Still referring to FIGS. 1-11, and especially to FIGS. 12A-12D, during use the connector 26 connects the first fluid line 22 to barbed connector 120 which, depending on the shape of the barbed connector 120, connects to another fluid line 24 using an in-line barbed connector 120 as shown in FIG. 12A, or connects the first fluid line 22 to another fluid line at an angle using an angled barbed connector 120', or connects the first fluid line 22 to more than one fluid lines using a multi-line barbed connector such as the T barbed connector 120" of FIG. 12C, or terminates the fluid line by using a blind barbed connector or plug barbed connector 120''' as shown in FIG. 12D. As the fluid connection with a single fluid line is achieved the same way for each of these connectors of FIGS. 12A-12D, only one connection or coupling is described in detail.

The barbed connector 120 has at least one connector body 121 forming a tubular passage through which fluid passes during use (except for the plug of FIG. 12D). Each connector body 121 is preferably cylindrical and has first and second barbs 130, 132, respectively, spaced apart a distance along axis 28 of the connector body 121. The barbs 130, 132 are inclined so they enter the inside of the fluid line 22 more easily but resist being withdrawn from the fluid line 22, 24. Each barb 130, 132 extends around a circumference of the connector body 121 to encircle a central axis, and forms a conical surface. Each barb 130, 132 has an inclined surface facing outward and increasing in radial distance from the central axis and extending along a short distance of that axis along a length of each barb 130, 132, so the inclined barb surface faces the distal end 122 (or 124). Each barb 130, 132 has an end formed by a sharp reduction change in radial distance at the largest diameter of the barb so the end forms a catch which resists removal in a direction opposite to the barb's inclined surface, just as the barb on an arrow resists withdrawal of the arrow. Each barb's end is shown in the figures as a surface orthogonal to the longitudinal axis 28 with that orthogonal surface facing the first retainer flange 126 (or the second retainer flange 128), but it would be appreciated by a person skilled in the art that the barb ends may take a different shape. The first barb 130 advantageously has a sharp peripheral edge at the juncture of the inclined surface and the orthogonal end. The second barb 132 advantageously has a generally flat, annular surface at its largest diameter, with the flat having an axial length about the same as or slightly less than the cylindrical surface adjoining the sleeve retaining ledge 40.

The first barb 130 is closer to a proximal end 122 of the connector body 121 on which the barbs are located, and the second barb 132 is closer to a first connector flange 126 extending outward relative to the central axis through the barbed connector 120. The first connector flange 126 advantageously extends in a plane orthogonal to the flow path and longitudinal axis of the connector body 121 on which barbs and flange 126 are located. The barbs 130, 132 encircle the body portion 121 of the connector 120 which forms a fluid passage 134 placed in fluid communication with the first fluid line 22. The proximal end 122 of the barbed connector 120 preferably extends a short distance beyond the first barb 132, and preferably has an outer diameter about the same as the inner diameter of the first fluid line 22 so the proximal end 122 can fit inside the fluid line 22. The proximal end 122 enters the inside of the fluid line 22 and advantageously extends far enough into that fluid line 22 to align the barbed connector 120 with the fluid line 22 so the longitudinal axes of each part are substantially aligned. The length of the end of the connector 120 from the first barb 130 to the proximal barbed connector end 122 varies with the diameter of the fluid line, but a distance of at least two times the wall thickness is believed suitable for most fluid lines, with a distance of about two to six times the wall thickness believed suitable for fluid lines varying from 0.5 to 2-inch nominal diameter.

Figure 9:
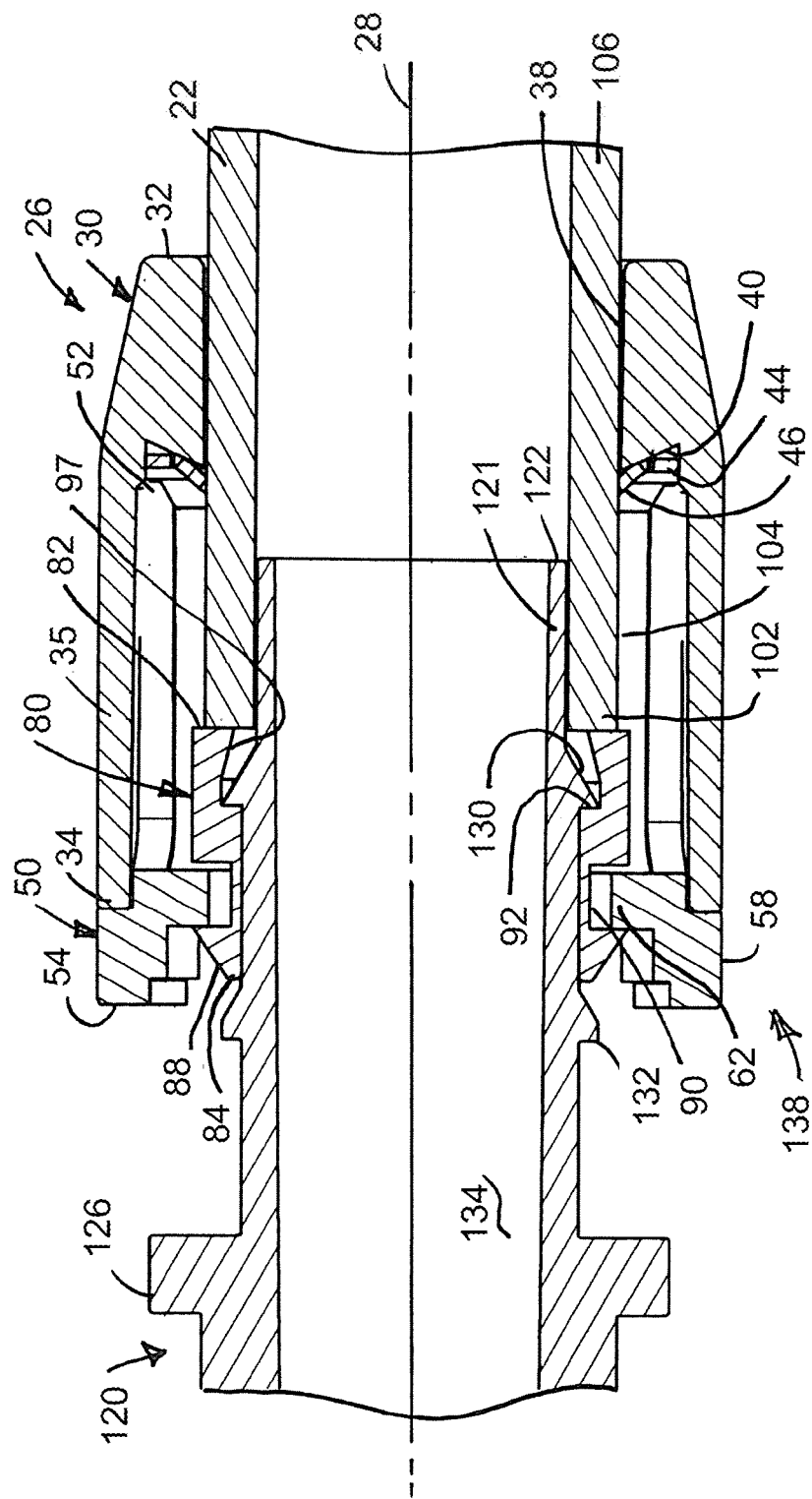
FIG. 9 is a sectional view taken along the longitudinal axis of the connector and the first fluid line of FIG. 8, with a locking part and fluid line in a first position, and with a barbed connector in a first position.

Referring to FIGS. 1-11, and especially to FIGS. 8-9, the right side of FIG. 11 and FIG. 12A, the fluid connection between the barbed connector 120 and the first fluid line 22 is described. As the various barbed connectors of FIGS. 12A-12D have the same general connection arrangement, the description of how the fluid coupling forms with the barbed connector 120 also applies to the other barbed connectors of FIGS. 12B-12D, or any connector having the basic characteristics of those connectors, such as the barbs.

The barbed connector 120 advantageously has two coupling positions with the connector 26 and first fluid line 22, one which couplings intentional leaks and one which does not leak. The leaking coupling is an intermediate position that makes it easy to confirm the parts are not correctly connected. The first connector position 138 is shown in FIG. 9, in which the proximal end 122 of the connector 120 is inside the distal end 102 of the first fluid line 22 to align the flow paths of the connector 120 and fluid line 22 along the longitudinal axis 28. In the first connector position 138, the first barb 130 passes through the distal end of the locking ring 80 and catches against the inner locking ring ledge 92 of the locking ring 80 to prevent the barbed connector 120 from being withdrawn out of the connector 26 along the longitudinal axis 28. The first barb 130 has a larger diameter than the generally cylindrical opening defined by the locking flange 88, causing the locking flange 88 to expand outward along with the engaging recess 90. The locking ring slot 94 allows the outward expansion of the resilient locking ring 80. The proximal facing side of the first barb 130 is inclined outward and toward the first connector flange 126 so as to slide inside the opening defined by the locking flange 88, with the locking ring 80 moving resiliently inward once the first barb 130 moves into the recess formed by the inner locking ring ledge 92. The first barb 130 engages the locking ring ledge 92 such that the locking ring 80 resiliently clamps inward to releasably secure the first barb 130 thereto.

The maximum diameter of the first barb 130 expands the locking ring 80 outward such that the engaging recess 90 also expands outward toward the collet flange 62. In this regard, the radial dimensions of the engaging recess 90 and collet flange 62 expand to allow this radial movement while maintaining the collet flange 62 engagement with the engaging recess 90 as the first barb 130 moves past the collet flange 62.

In the first position 138 of the barbed connector 120, a distal portion of the locking ring 80, between the distal locking ring end 84 and the inner locking ring ledge 92, is located between and urged against the outer surface of the connector 120 between the first and second barbs 130, 132, respectively. Accordingly, in the first position 138 of the barbed connector 120, the fluid connection between the proximal end 122 of the connector 120 and the first fluid line 22 is not fluid tight under normal household line pressures (of about 50 psi to about 100 psi). Likewise, the connection between the first barb 130 and the contacting parts of the locking ring 80 do not form a fluid tight seal under the same pressure. In the first connector position 138 of the barbed connector 120, there is also a visible gap between the distal end 54 of the collet 50 and the first connector flange 126. Thus, there are visual functional indications of an incomplete connection that make it easier for a user to recognize that the connection is incomplete and will leak.

The second position 140 of the barbed connector 120 in the connector 26 and fluid line 22 is shown in FIG. 10 and the right side of FIG. 11. As evident in these Figures, the first barb 130 provides a fluid tight seal with the fluid tube 22, while the first connector flange 126 stops the collet 50 and sleeve 30 from moving past the connector flange 126 in a first axial direction. The second barb 132 prevents the connector 26 from moving away from the first connector flange 126 in an opposing, second axial direction, and the grab ring 40 teeth prevent the first fluid line 22 from moving along the longitudinal axis away from the first connector flange 126 and out of the connector 26.

In more detail, the first fluid line 22 is pushed or pulled toward the first connector flange 126 so the distal end 54 of the collet 50 (or connector 26) contacts or is immediately adjacent to the first connector flange 126, providing a visual reference that the parts are correctly and complete engaged. As used here, the term "immediately adjacent to the first connector flange" refers to, for example, a distance measured in hundreds of an inch, preferably about 1/16 inch or less. Relative movement between the barbed connector 120 and fluid line 22 positions the parts to form the fluid tight connection. As discussed below, the way the connection is formed and the resulting connection is believed to offer advantages over the prior art.

The locking ring 80 is still visible through the notch 60 in the collet 50 providing visual confirmation of the locking ring 80 position. The first barb 130 is preferably, but optionally close enough to the distal ends of the grab ring teeth 46 to cause the outer surface 104 of the first fluid line 22 to bulge slightly outward and thus form an inclined surface that improves the ability of the grab ring teeth 46 to engage that outer surface 104. The distal end 102 of the first fluid 22 line extends past the first barb 130 and the first barb 130 deforms the wall 106 of the first fluid line 22 outward sufficiently to form a fluid tight seal at least at the outer periphery of the first barb 130, and preferably along the engaging surfaces of the first barb 130 and the inside of the first fluid line 22.

With reference to the above, the outer periphery of the first barb 130 has a sharp edge or a slightly rounded edge both of which are sufficiently sharp to form a seal with the inner surface of the first fluid line 22 around the periphery of the first barb 130. A sharp edge can include an edge having a defined radius as long as a fluid seal is formed around the periphery. Furthermore, the distal end 102 of the first fluid line 22 extends far enough past the first barb 130 so the distal end 102 contacts the outer surface of the barbed connector 120 around the outer circumference of the barbed connector 120, between the first and second barbs 130, 132, respectively. Advantageously, the distal end 102 of the first fluid line 22 contacts the proximal end 82 of the locking ring 80.

Once the barbed connector 120 fully engages the connector 26 with the first fluid tube 22, it is typically difficult to separate the parts without breaking something as the locking ring 80 and grab ring 42 prevent the distal end of the first fluid tube 22 from moving out of the connector 26. The hard, tubular body 121 of the barbed connector 120 inside the sleeve 30 prevents inward movement of the locking ring 80 and ensures the locking ring 80 remains engaged with the collet 50. In more detail, the interlocked parts include the second barb 132 engaging the inner locking ring ledge 92 to prevent pulling the barbed connector 120 out of the connector 26 and preventing pulling the engaged first tube 26 out of the connector 26. The first connector flange 126 prevents moving the end 122 of the barbed connector 120 into the connector 26 and first fluid line 22 too far as the connector flange 126 hits the end of the connector 26 to limit relative movement of the parts in one direction. The grab ring teeth 46 inhibit movement of the first fluid line 22 out of the opening in the proximal end of the sleeve 30 to prevent pulling the first fluid line 22 out of the connector 26. The teeth 46 flex inward when the first fluid line 22 is pulled in a direction outward from the connector 26 and the pulling on the fluid line 22 causes the teeth 46 to engage better and thus further restrain the fluid line 22 in the connector 26. In short, when the first and second barbs 130, 132 engage the locking ring 80 and fluid line 22, 24 inside the connector 26, the parts interlock and cannot be removed without typically breaking one or more of the parts forming the fitting assembly 20.

The differences between the first and second connector positions 138, 140 is best seen in FIG. 11, which shows both connector positions 138, 140. The connector 26 and barbed connector 120 allows the first barb 130 to form the fluid tight seal with the fluid line 22, while the connector 26 inhibits the fluid line 22 from moving along the longitudinal axis 28 toward the distal end 34 of the collet 50 and of the connector 26. The second barb 132 engages the inner locking ring ledge 92 to inhibit motion along axis 28 out the distal end of the connector 26, while the grab ring 42 inhibits the fluid line 22 from moving along the longitudinal axis 28 toward the proximal end 32 of the sleeve 30. The second barb 132 is thus advantageously slightly longer in the axial direction than the first barb 130, and the first barb 130 advantageously has a sharper outer edge to better engage and seal with the inside of the fluid line 22. The sealing and gripping are achieved through separate parts and separate functions. The grab ring 42 and locking ring 80 work together to hold the fluid tube 22 and connector 26 together and restrain movement along the longitudinal axis 28, while the interference between the first barb 130 and the distal end of the first fluid tube 22 forms a fluid tight seal.

Referring to FIG. 11, connecting a second fluid line 24 to the opposing side of the barbed connector 120 having first and second opposing ends 122, 124 is the same as connecting the first fluid line 22 and is not repeated. The left side of FIG. 11 shows a second fluid line 24 connected to a second connector 26 with the fluid line 24 and locking ring 80 in the second position and engaging a left side of connector 120 in the first position relative to second connector flange 128. Except for the connector flange 126 being flange 128, the same connection is shown and described in FIG. 9. The right side of FIG. 11 shows first fluid line 24 connected to a right side of the barbed connector 120 with the barbed connector in the second position as described above and shown in FIG. 10.

Referring to FIG. 11, the connector 120, and the other connectors, including those of FIGS. 12B-D, have a connector body 121 that is generally cylindrical with a cylindrical inner fluid passage 134 and cylindrical outer surface except for barbs 130, 132 and flanges 126, 128. The radial thickness of the wall of the connector body 121 is preferably not uniform. The inner diameter of the fluid passage 134 is advantageously constant, so the outer diameter varies. The wall thickness of the connector body 121 between the first barb 132 and the adjacent distal end 122 (or 124) is the smallest diameter, with the outer diameter selected to have the same diameter as the inner diameter of the fluid line 22 (or 24) with which the connector body 121 connects, or slightly smaller to ensure an easy fit. The outer diameter of the portion of the connector body 121 between the first and second barbs 130, 132, and between the second barb 132 and the closest connector flange 126, 128 is preferably slightly larger than the inner diameter of the undeformed fluid line 22, but may be the same the same diameter as the fluid line 22 or slightly smaller. The outer diameter of the portion between adjacent connector flanges 126, 128 may be larger than the inner diameter of the fluid line 22, and may be larger than the outer diameter.

Referring to FIGS. 9-12 and especially to FIGS. 11-12D, each of the connectors 120, 120', 120", and 120'" has a connector body 121 having a first end 122, and all but FIG. 12D show a fluid connector body 121 having a second end 124, with the fluid connector portions defining an interior fluid passage. Each of the connectors have a first and second, outward extending barb 130, 132 as described above, with the first barb 130 closer to the proximal end 122, 124, and the second barb 132 closer to the closest connector flange 126, 127 (FIG. 12C) or 128 (FIGS. 12A-12C). The connection of various fluid passages and barbs 130, 132 with the ends of the connector body 121 is the same as described above and is not repeated. The second connector 120" shows two fluid passages at a right angle (90° angle) to each other, but the angle of inclination can be varied between 1° and 180° (FIG. 12A). Additionally, FIG. 12C shows a connector 120'" suitable for joining three fluid lines, with three connector flanges 126, 127 and 128. However, more than three fluid lines may be connected in multiport connectors. For practical purposes, multiport connectors with at least ten to fifteen ports are possible, but most connectors have fewer ports. FIG. 12D shows a blind connector 120'" having an end flange 129 which blocks flow through the connector 120'", and hence may be referred to as an end connector or a plug. Other configurations of the connectors may be provided and the connector 26 described herein may be used with such other barbed connectors having the first and second barbs 130, 132 encircling the fluid passages to be connected to the fluid line 22, 24 using the connector 26. One example of such other connectors is a connector having two or more connector bodies 121 of different inner and outer diameter to connect fluid lines of different diameter.

Referring to FIGS. 9-11 and 13-14, the fluid line 22 is manually pushed into the connector 26 to move the locking ring 80 to the second position and form a connector containing the connected fluid line. The connector 26 and connected fluid line may be manually pushed (without a tool) onto the barbed connector 120 to move the barbed connector 120 and connector 26 into the first position 138 of the barbed connector 120 and connector 26. Advantageously, a connector tool 144 is used to place the connector 26, 120 in the second position of the barbed connector and connector 140 (FIG. 10). Electric, hydraulic and manually operated hinged tools (e.g., FIGS. 14A-14B) may be used to connect the fluid tubes and fitting assembly 20.

Figure 13:
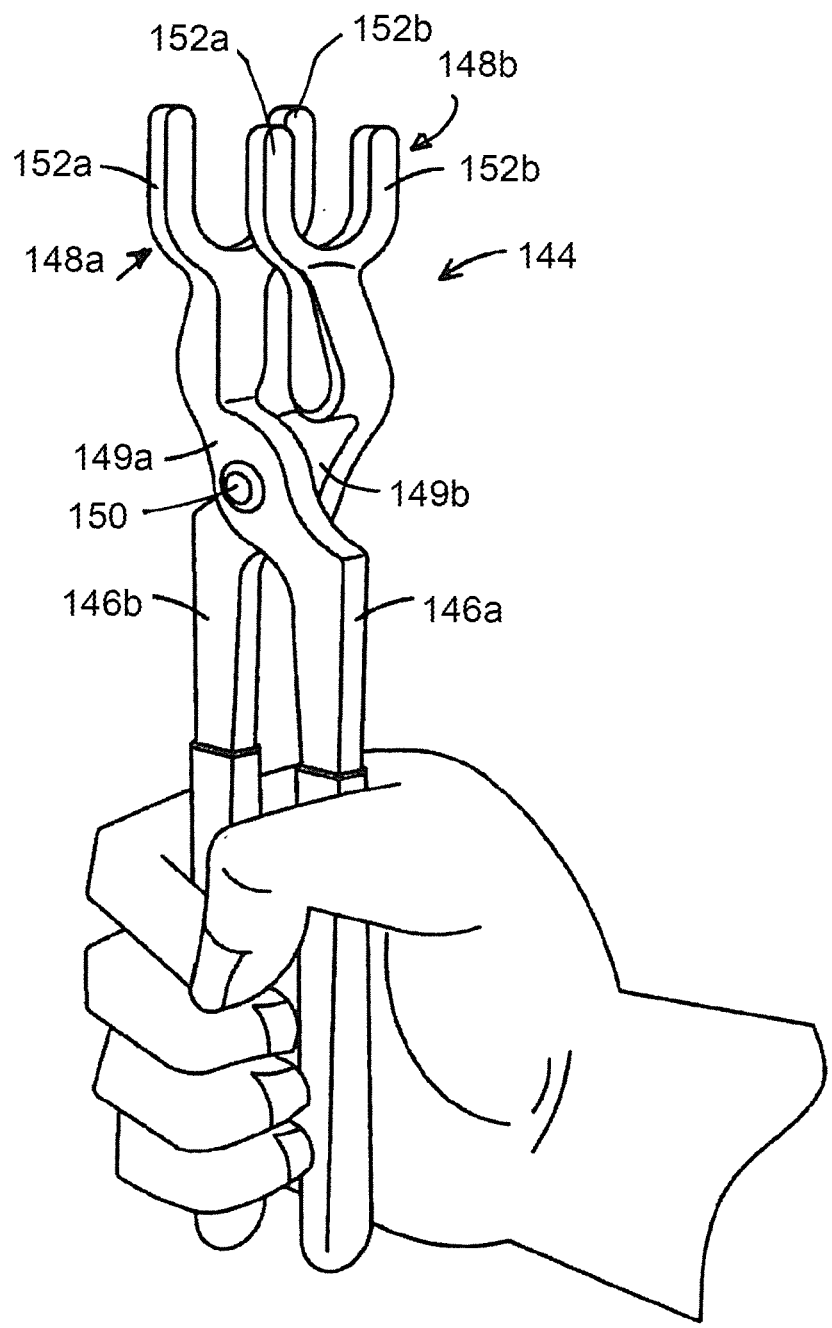
FIG. 13 illustrates a connector tool, according to an embodiment.
Figure 14:
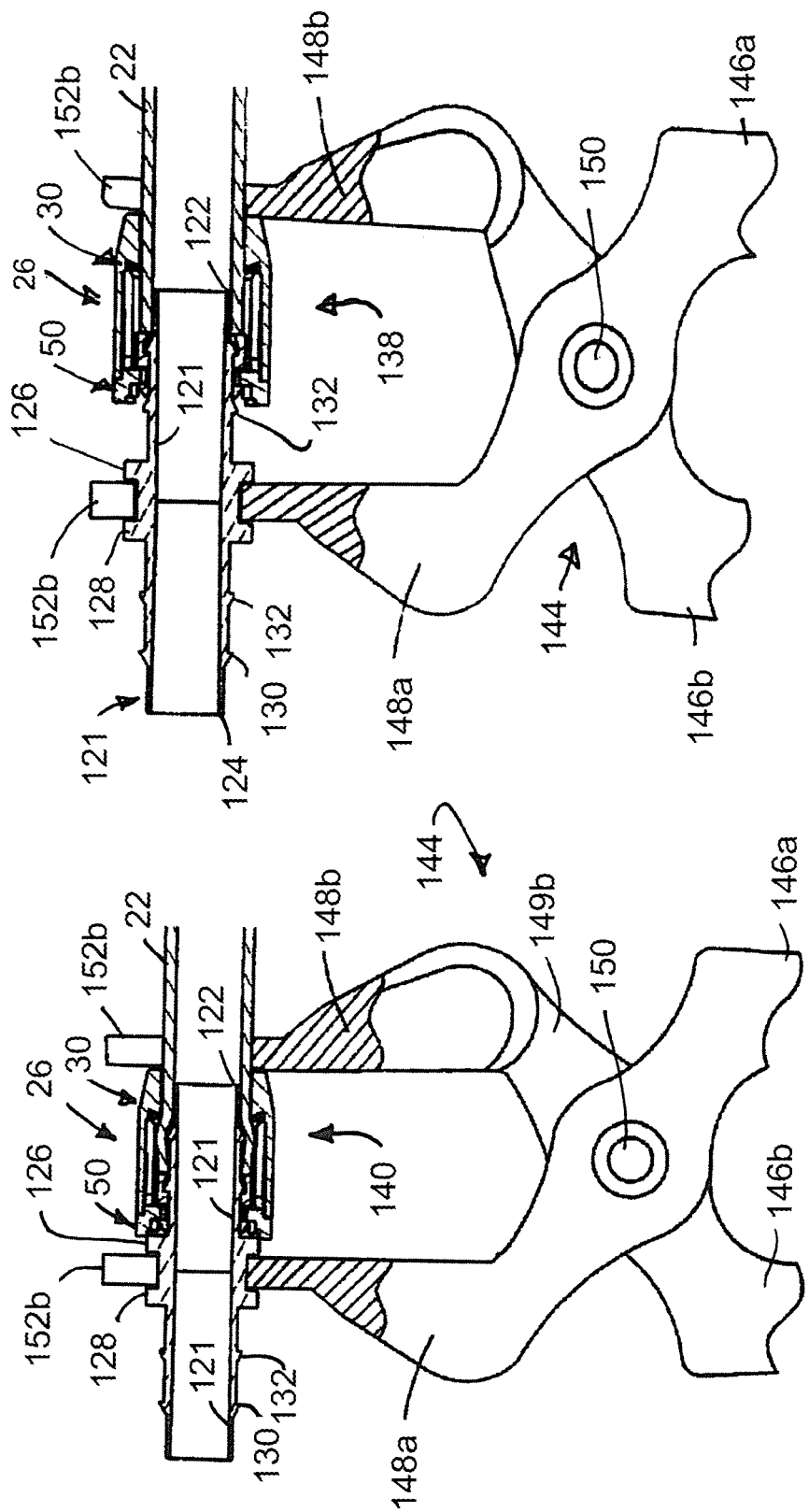
FIG. 14A illustrates the use of the connector tool, shown in FIG. 13, connecting a fluid line to the fitting assembly.
FIG. 14B further illustrates the use of the connector tool.

As shown in FIG. 13, the connector tool 144 is a pliers-like tool having two handles 146a, 146b each having a jaw 148a, 148b, respectively on a distal end of the handles 146a, 146b. The handles 146a, 146b are joined at a pivot 150 and each jaw 148a, 148b is offset laterally from its respective handle 146a, 146b so the jaws are spaced laterally apart by lateral segments 149a, 149b, respectively. The pivot 150 extends through the lateral segments 149, so that moving the handles 146a, 146b toward each other moves the jaws 148a, 148b toward each other and moving the handles 146a, 146b apart move the jaws 148a, 148b apart. Each jaw 148a, 148b preferably has a U-shaped configuration formed at the bottom of the tines 152 so the bottom of the U accepts (receives) the curved fluid line, with first and second tines 152a, 152b. A similar tool is described in published U.S. patent application no. 2008/0314205, the complete contents of which is incorporated herein by reference.

In use, the tines 152a, 152b of a first jaw 148a are placed on opposing sides of first tube 22 and abutting the front end 32 of the sleeve 30. The tines 152a, 152b of a second jaw 148b are placed on a distal side of the first connector flange 126. The jaws 148a, 148b and their tines 152a, 152b are moved toward each other to move the connector 26 and its fluid line 22 relative to the barbed connector 120 and move the parts from the first position 138 to the second position 140, bearing in mind that the parts are typically moved into the first position 138 hand. The connector tool 144 allows movement of the connector 26 and fluid line 22 relative to the first and second barbs 130, 132 to engage the barbed connector 120 with the connector 26 (including the fluid line 22) to form a fluid tight connection. It is useful to have the grab ring teeth 46 engage the outside of the first fluid tube 22 as the fluid tube 22 and connector 26 move relative to the barbed connector 120 to form the fluid connection. The relative movement may be considered as the connector 26 pulling the first fluid tube 22 over the barbed connectors 130, 132 or it may be viewed as pushing the barbed connectors 130, 132 into the first fluid tube, or both.

Further to the above, the connector 26 is believed to offer advantages over prior art fluid connections arising from the way the distal end 102 of the first fluid line 22 is moved over the first barb 130 to form a fluid tight seal. For example, and for ease of reference, as seen in FIG. 10, the right side of FIG. 11, and in FIG. 14A and FIG. 14B, the grab ring teeth 46 engage the wall 106 of the fluid line 22 inside the connector 26 and right by the sleeve retaining ledge 40. To the proximal side of the ledge 40 and teeth 46, the tubular wall 106 is radially constrained between the first connector body 121 and the inward facing sleeve surface 38. To the distal side of the ledge 40 and teeth 46, is the first barb 130, which moves progressively closer to the teeth 46 as the second position 140 is achieved.

The fluid line 22, teeth 46, connector body 121 and first barb 130 are aligned along the commonly shared longitudinal axis 28. The fluid line 22 is held inside the sleeve 30 and moves axially with and as part of the sleeve 30 and connector 26, all aligned along longitudinal axis 28. As the sleeve 30 moves toward the first connector flange 126 along axis 28, the grab ring teeth 46 are believed to grab the wall 106 of the fluid line 22 and move the fluid line 22 with the sleeve 30, thus pulling the fluid line 22 over the first barb 132 as the sleeve 30 and connector 26 move, and pushing along axis 28 with grab ring teeth 46. The connector 26 is believed to move the grab ring 142 and fluid line 22 toward and past the first barb 130, so the fluid line 22 expands around the first barb 130 and then resiliently retracts inward against the connector body 121.

The tines 152 of the installation tool 144 advantageously push axially against proximal end 52 of the sleeve 30 and connector 26 and also axially against the first connector flange 126, to achieve a fluid tight connection with minimal damage to the distal end of the fluid line. The resulting fluid connection substantially leaves the outer surface 104 of the fluid line 22 undamaged compared to conventional systems. Moreover, conventional systems include examples where relatively long lengths of the tubular fluid lines are pushed on to form fluid connection, and because the fluid lines are flexible it is difficult to maintain alignment of the pushing force with the longitudinal axis of the tubes. The installation tool 144, along with the fitting assembly 20, helps avoid these difficulties and makes it easier to form the fluid connection.

The distal end 102 of the fluid line 22 is preferably square cut, orthogonal to longitudinal axis 28. Although, the fitting assembly 20 may accommodate a distal end 102 having a slanted cut, jagged cut or various other cuts with non-uniform edges and still provide a fluid tight seal. A distal end that is not square cut may push unevenly on the circular periphery of the locking ring 30 as the locking ring 30 moves from the first to the second positions, but the radial clearance between the locking ring and the inner periphery of the collet 50 reduces if not eliminates the ability of the locking ring 80 to jam between its first and second positions 98, 100. It is desirable to have the distal end of the fluid line 22 contact the outer surface of the connector body 121 of the barbed connector 120 around an entire circumference of the distal end of the body 121. However, larger divergences from square-cut ends may be accommodated by increasing the distance between the first and second barbs 130, 132, with a corresponding increase in the distance between the first and second locking ring positions 98, 100 and the resulting increase in the length of the connector 26. Alternatively, the length of the locking ring 80 may be increased to avoid rotation of the locking ring 80 within the sleeve in a plane out of the longitudinal axis 28. There is thus provided an in-line fluid coupling that accommodates fluid lines with distal ends that are not square cut.

The locking ring 80 is described as a slotted annular structure because a locking ring slot 94 extends through the locking ring 80, preferably parallel to or along the longitudinal axis 28. As noted above, the locking ring slot 94 allows the outer dimension of the locking ring 80 to change so the locking ring 80 can fit through the cylindrical, inward facing sleeve surface 38 on the proximal end 32 of the sleeve 30. The slot 94 also allows the locking ring 80 to expand and slip over the first and second barbs 130, 132. A projection 96 extends from the proximal end of each side of the locking ring slot 94 at the proximal end of that slot 94. Thus, the two projections 96 extend toward each other. The projections 96 are separated by a slight gap and make it more difficult to other parts to inadvertently slip into the locking ring slot 94 and entangle the parts and that is believed desirable during assembly and manufacturing of the connector 26.

The parts of the connector 26 and various connectors 120 may be made of metal (e.g., brass, stainless steel) or plastic suitable for the intended use, such as polyethylene or PPR. The various barbed connectors 120, the sleeve 30, collet 50 and locking ring 80 are advantageously formed of a continuously poured material which is referred to herein as integrally formed. The fluid lines 22, 24 are flexible and typically made of solid-wall, continuous material such as flexible plastics suitable for the intended use. The fluid lines 22, 24 may include multi-layer pipes, including layers of metal and plastic, with one or more continuous or woven layers.

The fitting assembly 20 may include the fluid line 22. The grab ring 42 holds the distal end of the fluid line 22 axially against the locking ring 80, thus providing an axial connection that is stiff. The grab ring 42 and the inward facing sleeve surface 38 restrains lateral movement of the fluid line 22. The fluid line 22 cannot be disengaged from the grab ring 42 without damaging the connector 26. Thus, the connector 26 provides a strong and sturdy connection with the fluid line 22. This allows a user to form several connections sequentially without having to worry about parts falling off, or moving out of alignment, and allows large movements of the fluid line's end and connector 26 without impeding the future connection using the connector 26. This connector 26 thus provides advantages in ease of use, durability and ease of assembly over prior art fluid couplings.

The fluid line 22 may be of any material suitable for the intended use of the fluid line and fitting assembly 20. Tubing made of materials such as PEX-A, PEX-B, PEX-C and PERT (polyethylene of raised temperature resistance pipe) are believed suitable. The connector 26 may be used to achieve a fluid tight coupling without having to flare or expand the end of the tubing before trying to pass the tube over the barbs of the fitting and without being limited to the PEX-A type of tubing or specialized types of tubing as in the prior art. The connection described herein uses the connector 26 to cause cold expansion of the distal end 102 of the fluid line 22 tubing as the tubing passes over the barb 130 and deforms to form a fluid tight seal between the barb 130 and the wall 106 of the first fluid line 22. A similar fluid connection is achieved on other ports of the connector 120. The fluid connection described herein is thus suitable for assembly at ambient environmental temperatures and without the use of specialized tools to expand the inner diameter of the tubing before the fluid connections are made; thus providing for a simpler, faster fluid tight connection.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of releasably connecting the locking ring to the collet or to the sleeve in the first position, and various ways of connecting the collet to the sleeve. Further, more than two barbs 130, 132 may be used on each end of the connector 120, although three or four barbs are likely to be the most barbs preferred on each side of the connector flange 126. Additionally, while the grab ring 42 is described as a separate metal part that fits inside the sleeve 30 and is located between the sleeve retaining ledge 40 and the collet 50, the grab ring, or more accurately, the grab ring teeth 46 may be integrally molded of a single piece of material with the collet 50 and extend inward at the desired location along the longitudinal axis when the connector 26 is formed. The use of plastic grab ring teeth 46 is believed to be sufficiently strong to resist withdrawal of the fluid line 22 (or 24) from the connector 26. Further, the various features of this invention can be used alone, or in varying combinations with each other and are not intended to be limited to the specific combination described herein. Thus, the invention is not to be limited by the illustrated embodiments.

Figure 15:
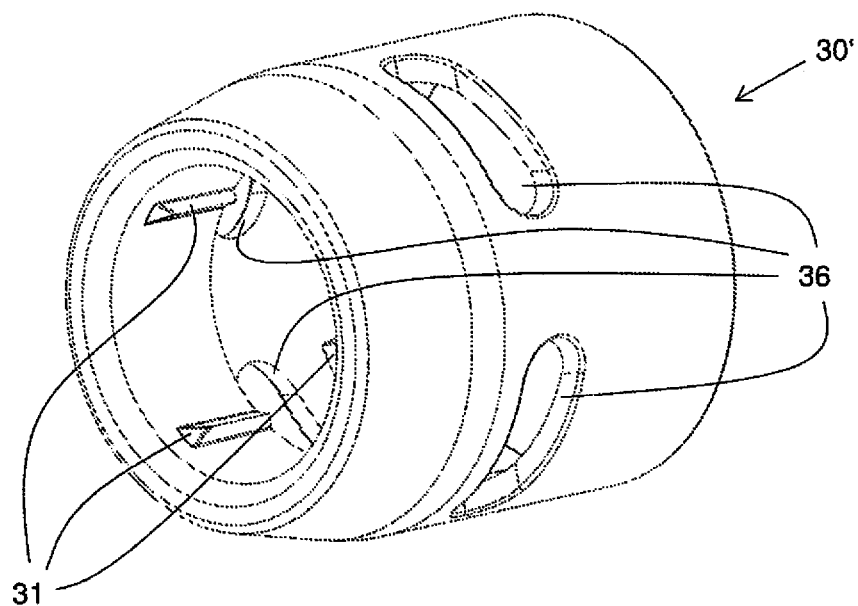
FIG. 15 is a sleeve of a connector, according to an embodiment.

To further illustrate other embodiments, FIG. 15 illustrates a sleeve 30'. The sleeve 30' is substantially the same as the sleeve 30 but includes one or more splines 31. In some implementations, four splines 31 may be present, for example. In other implementations, the sleeve 30' may have a greater or lesser number of splines 31. The splines 31 assist in preventing rotation of the fluid line 22, 24. This aids in, for example, the assembly of the fluid lines 22, 24 with respective connectors 26.

Figure 17:
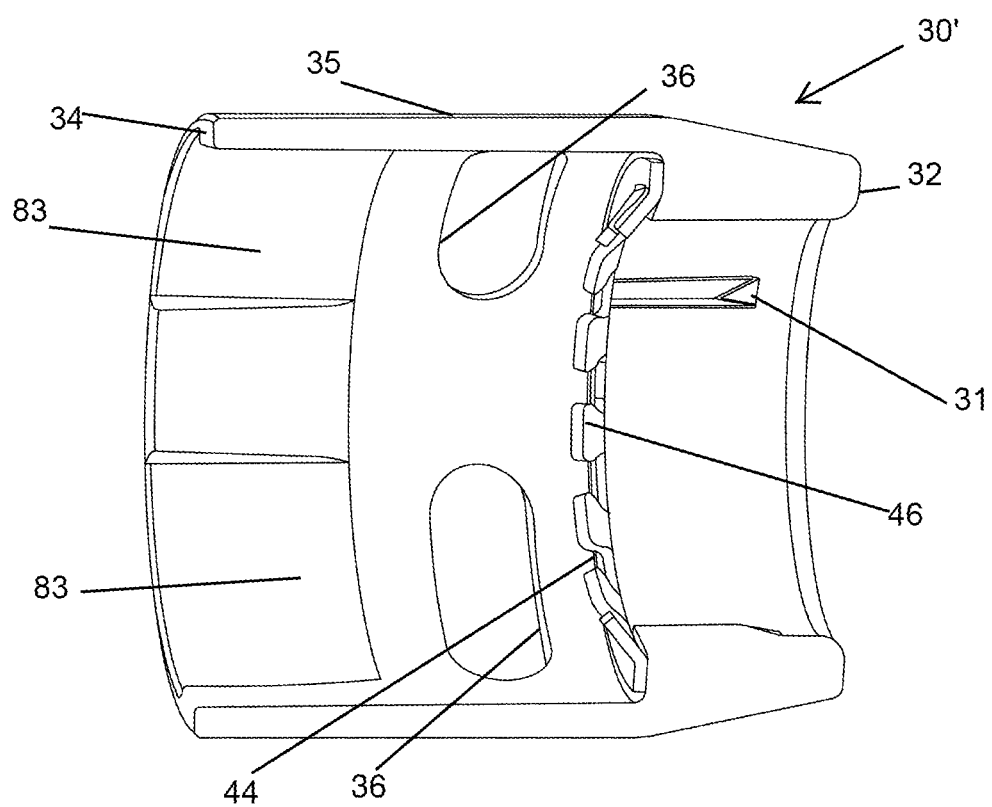
FIG. 17 is an interior of a sleeve, according to an embodiment.

Furthermore, as shown in FIG. 17, the sleeve 30' includes grooves 83 therein that assist with assembly of the sleeve 30' with the collet 50. The grooves 83 may be formed as shallow recesses in the sidewall of the sleeve 30'. In particular, the grooves 83 may engage with portions of the collet 50 so as to promote correct positioning of the collet 50.

Figure 16:
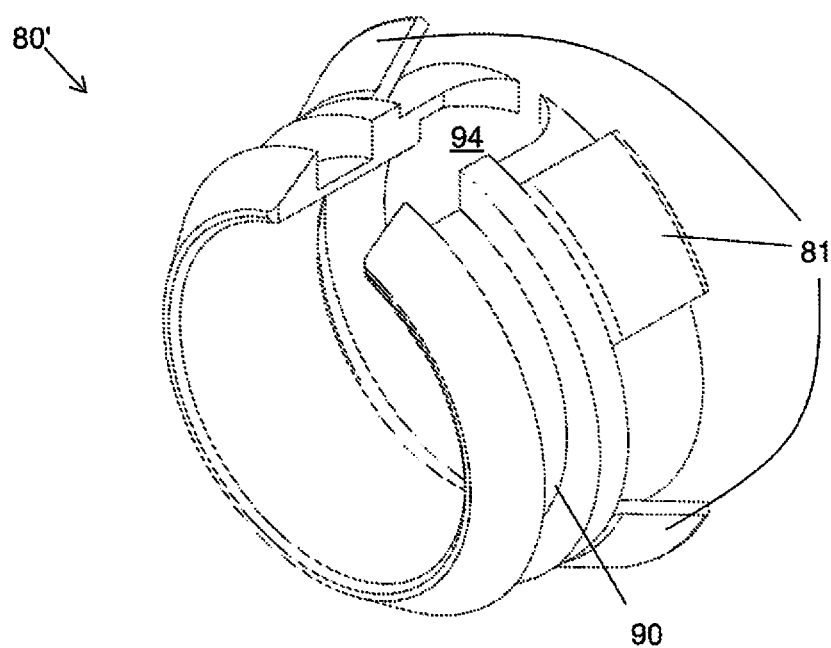
FIG. 16 is a locking part of a connector, according to an embodiment.

FIG. 16 also illustrates a locking part 80' according to another embodiment. The locking part 80' is substantially similar to the locking part 80 but includes one or more guiding members 81 that assist in guiding movement of the locking part 80' along the collet 50. That is, the guiding members 81 assists in centralizing the locking part 80' within the collet 50 as the locking part 80' moves therealong. The guiding members 81 are largely in the form of tabs in this embodiment but it will be appreciated that the guiding members 81 may take other forms.

In this specification, adjectives such as left and right, top and bottom, hot and cold, first and second, and the like may be used to distinguish one element or action from another element or action without necessarily requiring or implying any actual such relationship or order. Where context permits, reference to a component, an integer or step (or the alike) is not to be construed as being limited to only one of that component, integer, or step, but rather could be one or more of that component, integer or step.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

ITEM LIST

20—Fitting assembly
22—First fluid line
24—Second fluid line
26—Connector
28—Longitudinal axis
30—Tubular sleeve
31—Spline
32—proximal sleeve end
34—Distal sleeve end
35—Sleeve sidewall
36—Locking sleeve opening
38—Inward facing sleeve surface
40—Sleeve retaining ledge
42—Grab ring
44—Grab ring base
46—Grab ring teeth
50—Collet
52—Proximal collet end
54—Distal collet end
56—Collet sidewall
58—Collet base;
59—Outer step on collet base
60—Collet notch in collet base
62—Collet flange
64—Locking tab
68—Collet slot
80—Locking ring
81—Guiding member
82—Proximal locking ring end
83—Groove
84—Distal locking ring end
86—Locking ring base
88—Locking flange
90—Engaging recess
92—Inner locking ring ledge
94—Locking ring slot
96—Projection on axial locking ring slot
97—Inward facing, inclined surface on locking ring
98—First position of locking ring
100—Second position of locking ring
102—Distal end of the first fluid line
104—Outer surface of the first tube
106—Wall of the first fluid line
108—Inclined inside surface of the locking ring base
120—Barbed connector
121—Connector body
122—First connector end
124—Second connector end
126—First connector flange
128—Second connector flange
129—End flange
130—First barb
132—Second barb
134—Connector fluid flow path;
136—First outer diameter
138—First position of barbed connector and connector
140—Second position of barbed connector and connector
144—Connector tool 146a,b—Handles
148a,b—Jaws
149a,b—Lateral segments
150—Pivot
152a,b—Tines

What is claimed is:

1. A connector for a fluid line, the connector comprising:
 a sleeve having a hollow portion at least partway therethrough, the sleeve including an engaging portion;
 a collet having an engaging part secured to the engaging portion;
 a grab part having one or more teeth that are configured to retain the fluid line, the teeth being located in the hollow portion; and
 a locking part having a locking portion,
 wherein the locking part is configured to move from a first position to a second position where the locking portion locks with a locking piece to assist with providing a structure that forms a fluid seal with the fluid line; and
 wherein the collet includes the locking piece.

2. The connector of claim 1, wherein in the first position, the locking part is substantially adjacent to the grab part.

3. The connector of claim 1, wherein the locking part is flexible.

4. The connector of claim 1, wherein the locking part includes a sidewall having an opening at least part therealong to assist in expanding and contracting the locking part.

5. The connector of claim 1, wherein the locking part is configured to contract and expand in order for the locking portion to lock with the locking piece.

6. The connector of claim 1, wherein the locking portion includes a recess.

7. The connector of claim 1, wherein the locking part includes a flange near the locking portion.

8. The connector of claim 7, wherein the flange includes an inclined surface.

9. The connector of claim 1, wherein the locking part includes one or more guides that are configured to move along one or more parts of the collet.

10. The connector of claim 1, wherein the collet includes an aperture disposed such that when the locking part is in the second position, the locking part is visible through the aperture.

11. The connector of claim 1, wherein the sleeve includes one or more splines that are configured to assist in preventing rotation of the fluid line.

12. The connector of claim 1, wherein the grab part is retained between a sleeve retaining ledge and an end of the collet.

13. The connector of claim 1, wherein the locking part is configured to move along an axis defined by a central axis of the collet.

14. A fitting assembly for a fluid line, the fitting assembly comprising:
 a connector comprising:
  a sleeve having a hollow portion at least partway therethrough, the sleeve including an engaging portion;
  a collet having an engaging part secured to the engaging portion;
  a grab part having one or more teeth configured to retain the fluid line, the teeth being located in the hollow portion;
  a locking part having a locking portion; and
 a barbed connector having a barb, the barbed connector configured to be moved through at least part of the connector such that the barb engages with an internal portion of the fluid line,
 wherein the locking part is configured to move from a first position to a second position where the locking portion locks with a locking piece so as to cause the barb to form a fluid seal with the fluid line.

15. The fitting assembly of claim 14, wherein the barb forms the fluid seal with the fluid line by expanding at least part of the fluid line over the barb.

16. The fitting assembly of claim 14, wherein the barbed connector is supported by the locking part.

17. The fitting assembly of claim 14, wherein the locking part is configured to expand as the barbed connector is moved therethrough.

18. The fitting assembly of claim 14, wherein the barbed connector includes a second barb configured to engage with the locking part such that the barb connector is unable to be readily removed therefrom.

19. The fitting assembly of claim 18, wherein the second barb engages a locking ledge of the locking part in order to be secured thereto.

20. The fitting assembly of claim 14, wherein the barbed connector includes a flange that provides a stop to limit movement of the barb connector through the connector.

21. The fitting assembly of claim 14, wherein the grab part assists in holding the fluid line in order to allow the barbed connector to be inserted through the fluid line.

22. A kit for connecting one or more fluid lines, the kit comprising:
 a fitting assembly as claimed in claim 14; and
 a fluid line.

23. A connector extending along a longitudinal axis, comprising:
 a tubular outer sleeve having opposing first and second sleeve ends encircling the longitudinal axis;
 a grab part inside the outer sleeve and intermediate the first and second sleeve ends and centered around the longitudinal axis, the grab part having a plurality of teeth inclined inward toward the longitudinal axis and toward the second sleeve end;
 a generally cylindrical collet extending along the longitudinal axis and having opposing first and second collet ends, with the second collet end adjacent the second sleeve end, the collet located inside the outer sleeve and fastened to the outer sleeve;
 a locking part at least partially inside the collet and movable along the longitudinal axis between a first position at the first collet end and a second position at the second collet end, the locking part structured to releasably engage the teeth in the first position; and
 engage with a locking piece in the second position that substantially prevents movement of the locking part along the longitudinal axis.

24. A connector for connecting at least a first fluid line, the connector comprising:
 a sleeve having opposing first and second sleeve ends;
 a collet connected to the second sleeve end and extending along an axis of the sleeve; w
 a grab part having grab teeth extending inward and toward the second sleeve end, wherein the collet and an inwardly extending ledge provided on the sleeve are configured to restrain motion of the grab part restrained along the axis;
 a locking part having a first position in which the locking part is releasably held at the first sleeve end by the grab ring, the locking part having a second position in which the locking part is restrained at the second sleeve end by a portion of the collet;

wherein the grab teeth are configured to hold a distal end of the first fluid line.

25. A connector for a fluid line, the connector comprising:
a sleeve having a hollow portion at least partway therethrough, the sleeve including an engaging portion;
a collet having an engaging part secured to the engaging portion;
a grab part having one or more teeth that are configured to retain the fluid line, the teeth being located in the hollow portion; and
a locking part having a locking portion,
wherein the locking part is configured to move from a first position to a second position where the locking portion locks with a locking piece to assist with providing a structure that forms a fluid seal with the fluid line; and
wherein in the first position, the locking part is substantially adjacent to the grab part.

26. A connector for a fluid line, the connector comprising:
a sleeve having a hollow portion at least partway therethrough, the sleeve including an engaging portion;
a collet having an engaging part secured to the engaging portion;
a grab part having one or more teeth that are configured to retain the fluid line, the teeth being located in the hollow portion; and
a locking part having a locking portion,
wherein the locking part is configured to move from a first position to a second position where the locking portion locks with a locking piece to assist with providing a structure that forms a fluid seal with the fluid line; and
wherein the locking part includes a sidewall having an opening at least part therealong to assist in expanding and contracting the locking part.

27. A connector for a fluid line, the connector comprising:
a sleeve having a hollow portion at least partway therethrough, the sleeve including an engaging portion;
a collet having an engaging part secured to the engaging portion;
a grab part having one or more teeth that are configured to retain the fluid line, the teeth being located in the hollow portion; and
a locking part having a locking portion,
wherein the locking part is configured to move from a first position to a second position where the locking portion locks with a locking piece to assist with providing a structure that forms a fluid seal with the fluid line; and
wherein the locking part includes one or more guides that are configured to move along one or more parts of the collet.

28. A connector for a fluid line, the connector comprising:
a sleeve having a hollow portion at least partway therethrough, the sleeve including an engaging portion;
a collet having an engaging part secured to the engaging portion;
a grab part having one or more teeth that are configured to retain the fluid line, the teeth being located in the hollow portion; and
a locking part having a locking portion,
wherein the locking part is configured to move from a first position to a second position where the locking portion locks with a locking piece to assist with providing a structure that forms a fluid seal with the fluid line; and
wherein the collet includes an aperture disposed such that when the locking part is in the second position, the locking part is visible through the aperture.

29. A connector for a fluid line, the connector comprising:
a sleeve having a hollow portion at least partway therethrough, the sleeve including an engaging portion;
a collet having an engaging part secured to the engaging portion;
a grab part having one or more teeth that are configured to retain the fluid line, the teeth being located in the hollow portion; and
a locking part having a locking portion,
wherein the locking part is configured to move from a first position to a second position where the locking portion locks with a locking piece to assist with providing a structure that forms a fluid seal with the fluid line; and
wherein the sleeve includes one or more splines that are configured to assist in preventing rotation of the fluid line.

30. A connector for a fluid line, the connector comprising:
a sleeve having a hollow portion at least partway therethrough, the sleeve including an engaging portion;
a collet having an engaging part secured to the engaging portion;
a grab part having one or more teeth that are configured to retain the fluid line, the teeth being located in the hollow portion; and
a locking part having a locking portion,
wherein the locking part is configured to move from a first position to a second position where the locking portion locks with a locking piece to assist with providing a structure that forms a fluid seal with the fluid line; and
wherein the grab part is retained between a sleeve retaining ledge and an end of the collet.

* * * * *